United States Patent
Nagamori et al.

(10) Patent No.: US 9,893,365 B2
(45) Date of Patent: Feb. 13, 2018

(54) ELECTRODE CATALYST, COMPOSITION FOR FORMING GAS DIFFUSION ELECTRODE, GAS DIFFUSION ELELCTRODE, MEMBRANE-ELECTRODE ASSEMBLY, AND FUEL CELL STACK

(71) Applicant: N.E. CHEMCAT Corporation, Tokyo (JP)

(72) Inventors: Kiyotaka Nagamori, Bando (JP); Tomoteru Mizusaki, Bando (JP); Yoko Nakamura, Bando (JP); Hiroshi Igarashi, Bando (JP); Yasuhiro Seki, Bando (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 15/102,438

(22) PCT Filed: Aug. 27, 2015

(86) PCT No.: PCT/JP2015/004320
§ 371 (c)(1),
(2) Date: Jun. 7, 2016

(87) PCT Pub. No.: WO2016/031251
PCT Pub. Date: Mar. 3, 2016

(65) Prior Publication Data
US 2016/0322644 A1 Nov. 3, 2016

(30) Foreign Application Priority Data
Aug. 28, 2014 (JP) .................................. 2014-174564

(51) Int. Cl.
*H01M 4/92* (2006.01)
*H01M 4/86* (2006.01)
(Continued)

(52) U.S. Cl.
CPC .......... *H01M 4/8657* (2013.01); *B01J 27/22* (2013.01); *B01J 35/08* (2013.01); *H01M 4/86* (2013.01);
(Continued)

(58) Field of Classification Search
CPC ............................................. H01M 4/86–4/928
See application file for complete search history.

(56) References Cited

U.S. PATENT DOCUMENTS

| 2006/0263675 A1 | 11/2006 | Adzic et al. |
| 2007/0031722 A1 | 2/2007 | Adzic et al. |

(Continued)

FOREIGN PATENT DOCUMENTS

| JP | 2003-80077 A | 3/2003 |
| JP | 2005-125282 A | 5/2005 |

(Continued)

OTHER PUBLICATIONS

International Search Report dated Dec. 1, 2015, issued in counterpart International Application No. PCT/JP2015/004320 (2 pages).
(Continued)

*Primary Examiner* — Jonathan Crepeau
*Assistant Examiner* — Jacob Buchanan
(74) *Attorney, Agent, or Firm* — Westerman, Hattori, Daniels & Adrian, LLP

(57) ABSTRACT

To provide electrode catalyst which has the catalyst activity and durability at a practically durable level and contributes to lowering of the cost in comparison with the conventional Pt/C catalyst. The electrode catalyst has a support and catalyst particles supported on the support. The catalyst particle has the core part, the first shell part formed on the core part, and the second shell part formed on the first shell part. The core part contains W compound including at least (Continued)

US 9,893,365 B2
Page 2

W carbide, the first shell part contains simple Pd, and the second shell part contains simple Pt.

13 Claims, 6 Drawing Sheets

(51) Int. Cl.
| | |
|---|---|
| *B01J 27/22* | (2006.01) |
| *B01J 35/08* | (2006.01) |
| *H01M 4/90* | (2006.01) |
| *H01M 8/1004* | (2016.01) |
| *H01M 8/10* | (2016.01) |
| *H01M 8/1018* | (2016.01) |

(52) U.S. Cl.
CPC ........... *H01M 4/90* (2013.01); *H01M 4/9016* (2013.01); *H01M 4/9075* (2013.01); *H01M 4/92* (2013.01); *H01M 4/925* (2013.01); *H01M 8/1004* (2013.01); *H01M 8/10* (2013.01); *H01M 2008/1095* (2013.01)

(56) References Cited

U.S. PATENT DOCUMENTS

| | | | | |
|---|---|---|---|---|
| 2007/0037039 | A1* | 2/2007 | Chondroudis | B01J 23/8993 502/185 |
| 2012/0046164 | A1 | 2/2012 | Tanaka et al. | |
| 2012/0208105 | A1* | 8/2012 | Arai | H01M 4/921 429/524 |
| 2013/0150235 | A1* | 6/2013 | Roh | H01M 4/926 502/185 |
| 2015/0210554 | A1* | 7/2015 | Ma | C01B 31/34 429/524 |
| 2015/0255798 | A1* | 9/2015 | Shao | H01M 4/8657 429/524 |

FOREIGN PATENT DOCUMENTS

| | | |
|---|---|---|
| JP | 2008-21610 A | 1/2008 |
| JP | 2008-545604 A | 12/2008 |
| JP | 2010-501345 A | 1/2010 |
| JP | 2011-72981 A | 4/2011 |
| JP | 2012-41581 A | 3/2012 |
| JP | 2012-143753 A | 8/2012 |
| JP | 2012-216292 A | 11/2012 |
| JP | 2013-518710 A | 5/2013 |
| JP | 2013-163137 A | 8/2013 |
| WO | 2010/011170 A1 | 1/2010 |
| WO | WO 2011095943 A1 * | 8/2011 ............ H01M 4/921 |
| WO | 2012/011170 A1 | 1/2012 |

OTHER PUBLICATIONS

English translation of Notification of Reasons for Refusal dated Dec. 22, 2015, issued in counterpart Japanese Patent Application No. 2015-167902 (2 pages).

* cited by examiner

ELECTRODE CATALYST, COMPOSITION FOR FORMING GAS DIFFUSION ELECTRODE, GAS DIFFUSION ELELCTRODE, MEMBRANE-ELECTRODE ASSEMBLY, AND FUEL CELL STACK

TECHNICAL FIELD

The present invention relates to an electrode catalyst. Particularly, the present invention relates to an electrode catalyst suitably usable for a gas diffusion electrode, more suitably usable for a gas diffusion electrode of a fuel cell.

Also, the present invention relates to a composition for forming a gas diffusion electrode, a membrane-electrode assembly, and a fuel cell stack, each including the electrode catalyst particles.

BACKGROUND ART

A solid polymer electrolyte fuel cell (Polymer Electrolyte Fuel Cell: hereinafter called "PEFC" as needed) has been developed as a fuel cell vehicle, a home cogeneration system, and the like.

As a catalyst used for the gas diffusion electrode of PEFC, a noble metal catalyst composed of a noble metal of platinum group elements such as platinum (Pt).

For example, as a typical conventional catalyst, there has been known "Pt on carbon catalyst" (hereinafter called "Pt/C catalyst" as needed) (for example, Pt/C catalyst having a Pt support rate of 50 wt %, Trade Name: "NE-F50" available from N.E.CHEMCAT).

In the preparation costs of PEFC, a proportion of the noble metal catalyst such as Pt is large, and it is the problem to lower the PEFC cost and to spread PEFC.

To solve the problem, developments of technique for lowering the noble metal in the catalysts, or technique for de-noble metalizing have been progressed.

Among these developments, in order to reduce the amount of platinum to be used, a catalyst particle having a care-shell structure formed by a core part made of non-platinum element and a shell part made of Pt (hereinafter called "core-shell catalyst particle" as needed) has been studied, and there are many reports.

For example, in Patent Document 1, there is disclosed a particle composite material (core-shell catalyst particle) having a structure where palladium (Pd) or a Pd alloy (corresponding to the core part) is covered with an atomic thin layer of Pt atom (corresponding to shell part). Further in Example of this Patent Document 1, a core-shell catalyst particle where the core part is a Pd particle and the shell part is a layer made of Pt is described.

In addition, there has been studied a structure where a metal element other than the Pt group is contained as the structural element of the core part. To the contrary, there has been also proposed a structure where a metal element other than the Pt group is contained as the structural element of the shell part.

For example, as a structure containing tungsten (W) as the structural element of a core part, a structure having a core part made of simple W, a W alloy, a W oxide has been proposed (for example, Patent Documents 2 to 9).

In addition, as a structure containing W as the structural element of a shell part, a structure having a shell part made of simple W, a W alloy, a W oxide has been proposed (for example, Patent Document 10).

In more detail, Patent Documents 2 to 5 disclose structures having a core part containing a W oxide.

In Patent Document 2, there is disclosed a synthesis example of a catalyst having a structure that particles where a core part is $WO_2$ and a shell part is an alloy of a reduced product of $WO_2$ ($WO_{2y}$, $0<y\leq 2$) and Pd are supported on a carbon support (Patent Document 2, Example 8).

In Patent Document 3, there is disclosed a platinum-metal oxide composite particle where a core part is made of a W oxide (sodium tungsten oxide, etc.) and a shell part is made of Pt, etc.

In Patent Document 4, there is proposed a catalyst particle having a structure where a base particle (care part) is made of a metal oxide particle made of two or more solid solutions selected from simple W or a metal element group containing W and a metal coating layer (shell part) is made of a solid solution selected from simple Pt or a metal element group containing Pt.

In Patent Document 5, there is proposed a catalyst particle having a structure where a base particle (core part) is made of a W oxide, and at least of a part of the base particle surface is coated with one or more metals (shell part) such as Pt.

Further, Patent Documents 6 to 9 disclose structures having a core part containing simple W, or a W alloy (W solid solution).

In Patent Document 6, there is disclosed a catalyst particle where an inner core (core part) is made of simple W, an alloy of W and a metal selected from other metal group, or a mixture thereof, and an outer core shell part is made of Pt or a Pt alloy.

In Patent Document 7, there is disclosed a Pt-containing catalyst having a structure that a metal particle where a core particle (core part) is made of a metal atom other than Pt or an alloy of a metal atom other than Pt, and the surface of the core particle is coated with a shell layer (shell part) made of Pt is supported on an electrically conductive support. In this document, W is disclosed as the structural material of both of the core part and the shell part (Patent Document 7, Paragraph 0020, Paragraph 0021).

In Patent Document 8, there is disclosed a core-shell type fine particle which has a core particle (core part) having a face-centered cubic crystal structure made from a material of simple W or a W alloy, and a shell layer (shell part) having a face-centered cubic crystal structure made from a material of a metal such as Pt.

In Patent Document 9, there is disclosed a core-shell type fine particle which has a core particle (core part) made from a material of simple W or a W alloy, and a shell layer (shell part) made from a material of a metal such as Pt.

Further, though it is not clear as to whether or not the proposed particles correspond to a catalyst particle having a core-shell structure, there are proposed catalysts that Pt or a Pt aloy is supported on a W carbide particle as an electrode catalyst for a fuel cell (Patent Documents 11 to 12, Non-Patent Document 1).

In Patent Document 11, there is disclosed a catalyst where, in order to modify a surface of an electrically conductive carbon, a W carbide particle (particle of a mixture of WC and $W_2C$, or particle made of WC) is produced on the electrically conductive carbon, and then Pt particles are supported on this particle.

In Patent Document 12, there is disclosed a catalyst where Pt particles are supported on a particle mainly made of WC. However a structure where the catalyst particle is supported on an electrically conductive carbon is not studied.

In Non-Patent Document 1, there is disclosed a catalyst where Pt particles are supported on a particle mainly made of $W_2C$. However a structure where the catalyst particle is supported on an electrically conductive carbon is not studied.

Furthermore, in a catalyst particle having a core-shell structure formed of a core part made of a non-Pt element and a shell part made of Pt, there is proposed a structure where a catalyst activity is intended to be improved together with reduction of a Pt amount (for example, Patent Document 13).

For example, Patent Document 13 proposes an electrode catalyst fine particle for a fuel cell having a child core-shell structure which comprises a center particle (core part) containing a Pd alloy, a outermost layer (shell layer) containing Pt, and an intermediate layer consisting of simple Pd provided between the center particle and the outermost layer.

Incidentally, the present applicant submits, as publications where the above-mentioned publicly-known inventions are described, the following publications:

PRIOR ART DOCUMENT

Patent Document

Patent Document 1: US Un-examined Patent Application Publication No. 2007/31722
Patent Document 2: Japanese Un-examined Patent Application Publication No. 2012-143753
Patent Document 3: Japanese Un-examined Patent Application Publication No. 2008-545604
Patent Document 4: Japanese Un-examined Patent Application Publication No. 2005-125282
Patent Document 5: Japanese Un-examined Patent Application Publication No. 2003-080077
Patent Document 6: Japanese Un-examined Patent Application Publication No. 2010-501345
Patent Document 7: Japanese Un-examined Patent Application Publication No. 2011-072981
Patent Document 8: Japanese Un-examined Patent Application Publication No. 2012-041581
Patent Document 9: Japanese Un-examined Patent Application Publication No. 2013-163137
Patent Document 10: Japanese Un-examined Patent Application Publication No. 2012-216292
Patent Document 11: Japanese Un-examined Patent Application Publication No. 2013-518710
Patent Document 12: Japanese Un-examined Patent Application Publication No. 2008-021610
Patent Document 13: PCT International Patent Application Publication NO. WO2012/011170

Non-Patent Document

Non-Patent Document 1: Angew. Chem. Int. Ed. 2005, 44, 6557-660

SUMMARY OF THE INVENTION

Problem to be Solved by the Invention

However, with respect to an electrode catalyst for a fuel cell which contains a support and catalyst particles having a core-shell structure supported on the support, when researching the aforementioned prior arts from the viewpoint of electrode catalysts having a W compound (particularly W carbide) as a core part containing mainly a structural component, the present inventors have found that there are room for improvement because study and working examples were not enough with respect to the structure to obtain catalyst activity and durability of a practically durable level in comparison with the conventional Pt/C catalyst in addition to the degrease of Pt amount to be used.

Namely, in Patent Document 2 where the structure having a core part containing a W oxide, there is the working example of a catalyst having a structure that particles where a core part is $WO_2$ and a shell part is an alloy of a reduced product of $WO_2$ ($WO_{2y}$, $0<y\leq2$) and Pd are supported on a carbon support (Patent Document 2, Example 8), and there is shown that the catalyst activity of this working example is improved with respect to that of the comparative example (Patent Document 2, Comparative Example 2) where Pd particles are supported on a carbon support (Patent Document 2, FIG. 11). However, it is indefinite that the structure of this working example is an effective structure having a catalyst activity at a practically durable level and further having enough durability in comparison with the conventional Pt/C catalyst.

Further, in Patent Documents 3 to 5 where structures having a core part containing a W oxide are disclosed, there is no working example corresponding to a catalyst having a care part containing a W oxide, actual proof as to catalyst activity and durability is not obtained.

Namely, there is no working example in Patent Document 3. In addition, in Patent Document 4 and Patent Document 5, there is no description as to a working example of a catalyst having a structure where an electrically conductive carbon is used as a support. Further, when the structures of working examples are represented by "shell part/core part", the working examples are "Pt/$CeO_2$", "reduced and precipitated simple Pt and simple Ru/$CeO_2$", and "reduced and precipitated simple Pt and simple Ru/$CeO_2.ZrO_2$ solid solution", and the evaluation is conducted only by cleaning ability of a toxic substance.

Further, in Patent Documents 6 to 9 where structures having a core part containing simple W, or a W alloy (W solid solution) are disclosed, there is no working example corresponding to a catalyst having a core part having a core part containing simple W, or a W alloy (W solid solution), actual proof as to catalyst activity and durability is not obtained.

In Patent Document 6, when represented by "shell part/core part", the described and evaluated working examples only have structures of "Pt/Ag" (Patent Document 6, Example 1, Example 4), and "Pt/Au" (Patent Document 6, Example 2, Example 3). As to the evaluation of performance, there is only described that "in the electrochemical test by RDE (Rotating ring disk Electrode), a high relative activity could be obtained", it is not clear in detail what degree of the activity improvement could be obtained.

In Patent Document 7, when represented by "shell part/core part", the described and evaluated working examples only have structures of "Pt/Ru" (Patent Document 7, Example 1).

In Patent Document 8 and Patent Document 9, though there is described that "the W core fine particles (fine particles of simple W)" is synthesized, there is no working example where a shell part is formed thereon to be a catalyst. When represented by "shell part/core part", the described and evaluated working examples only have structures of "Pt/Ru", "Pt/Ni" (Patent Document 8, Paragraph [0111], Patent Document 9, Example 1 and Example 2).

Further with respect to Patent Document 11 where the catalyst Pt or a Pt alloy is supported on a W carbide is proposed, there is described a catalyst where a W carbide particle is produced on an electrically conductive carbon by surface-modification of the electrically conductive carbon, and then Pt particles are supported on this particle (Patent Document 11, Example 1, Example 2).

Specifically, when represented by "shell part/core part", the examples ("Example 1", "Example 2" of Patent Document 11) are Pt/(mixture of WC and $W_2C$), Pt/(particles of WC).

The durability of the catalyst (degree of lowering in initial performance) is estimated by an accelerated degradation test. Specifically, with respect to a catalyst activity relating to an oxygen reduction reaction of a cathode, a 150 potential cycles test is conducted between 0.5 to 1.3 V in an oxygen saturated electrolyte at a rate of 50 mV/s to measure a lowering of the performance, and then there is disclosed that the lowering of the performance is improved in comparison with the conventional Pt/C catalyst.

However, there is not disclosed any numerical data of the catalyst activities (Pt mass activity, etc.) in the examples and comparative examples, it is indefinite that the structure of this working example is an effective structure having a catalyst activity at a practically durable level and further having enough durability. In addition, it is also indefinite whether or not the catalyst particle of the working example disclosed in Patent Document 11 has a core-shell structure.

Further, with respect to Patent Document 12 where the catalyst that Pt or a Pt alloy is supported on a W carbide particle, there is not described a working example where catalyst particles are supported on an electrically conductive carbon support. There is shown that a catalyst prepared by supporting Pt particles on a WC synthesized through a particular precursor such as $W_2N$ or $WS_2$ (Patent Document 12, Examples 1 to 6) are improved in a CO toxicity resistance and an anode catalyst activity. However, it is indefinite that the structure of this working example is an effective structure having a catalyst activity at a practically durable level and further having enough durability in comparison with the conventional Pt/C catalyst.

Further, with respect to Non-Patent Document 1 where the catalyst that Pt or a Pt alloy is supported on a W carbide particle, there is not described a working example where catalyst particles are supported on an electrically conductive carbon support. There is disclosed an example of a catalyst having a structure where Pt particles are supported on $W_2C$. In addition, there is disclosed that, in comparison with a catalyst having a structure where alloy particles of Pt and Ru are supported on a carbon support, this example has an improved catalyst activity such as ECSA. However, it is indefinite that the structure of this working example is an effective structure having a catalyst activity at a practically durable level and further having enough durability in comparison with the conventional Pt/C catalyst.

The present invention has been completed under the above technical background, and is to provide an electrode catalyst which has the catalyst activity and durability at a practically durable level and contributes to lowering of the cost in comparison with the conventional Pt/C catalyst.

Further, the present invention is to provide a composition for forming a gas diffusion electrode including the electrode catalyst particles, a gas diffusion electrode, a membrane-electrode assembly (MEA), and a fuel cell stack.

Means to Solve the Problems

In a case that a W-based material is used as a component of a core part in order to reduce a Pt amount to be used, the present inventors have intensively studied a possible structure which gives practically durable level results from the viewpoints of catalyst activity and durability in comparison with the conventional Pt/C catalyst As a result, the present inventors have found that a structure having a core part containing at least a W carbide and two-layered shell part is effective, more specifically, a structure where a shell part containing simple Pd is provided between a core part and a shell part containing simple Pt (a structure that is not disclosed and suggested in prior arts), and the present invention has been completed.

More specifically the present invention comprises the following technical elements.

Namely, in accordance with the present invention, there can be provided an electrode catalyst (N1) comprises:
an electrically conductive support, and
catalyst particles supported on the support.
wherein
the catalyst particle comprises a core part formed on the support, a first shell part formed on the core part, and a second shell part formed on the first shell part,
the come part contains a W compound containing at least a W carbide,
the first shell contains simple Pd, and
the second shell contains simple Pt.

Though the detailed mechanism has not yet been found enough, by employing the aforementioned structure, the electrode catalyst has the catalyst activity and durability at a practically durable level and contributes to the low cost in comparison with the conventional Pt/C catalyst.

The "W carbide" in the present invention shows any manner that tungsten (W) atom and carbon (C) atom are bonded to be a compound. Examples include WC, $WC_{1-x}$ (0<x<1), $W_2C$, $W_3C$, and the like.

The W carbide can be confirmed by a X-ray diffraction (XRD). Namely, by irradiating a X-ray (Cu-Kα beam) to the W carbide to observe its diffraction spectrum, it can be confirmed from the specific peaks of the W carbide.

For example, WC gives, for example, the specific peaks such as 31.513°, 35.639°, 48.300°, 64.016° and 65.790° as peaks at 2θ (±0.3°) of the X-ray diffraction.

For example, $WC_{1-x}$ gives, for example, the specific peaks such as 36.977°, 42.887°, 62.027°, 74.198° and 78.227° as peaks at 2θ (±0.3°) of the X-ray diffraction.

For example, $W_2C$ gives, for example, the specific peaks such as 34.535°, 38.066°, 39.592°, 52.332° and 61.879° as peaks at 2θ (±0.3°) of the X-ray diffraction.

In Patent Document 13, there is disclosed a structure where an intermediate layer consisting only of simple Pd is disposed between a core part (center particle containing a Pd alloy) and a shell part (outermost layer containing Pt).

There is disclosed that the reason why the intermediate layer consisting of simple Pd is disposed is to make the state of coating of the shell part (outermost layer containing Pt) stable. More specifically, there is disclosed that since the lattice constant of Pd (3.89 angstrom) is near the lattice constant of Pt (3.92 angstrom), the platinum atom of the shell part (outermost layer containing Pt) can be more stable.

Provided that, in Patent Document 13, it is suggested that the affinity of the core part and the intermediate layer consisting of simple Pd is configured by considering the lattice constant of each component. Namely, the intermediate layer (layer consisting of simple Pd) is so configured to contain Pd as a common component with the core part (center particle containing a Pd alloy). This is supported because when producing the catalyst of Example 1 of Patent Document 13, the intermediate layer consisting of simple Pd is formed by removing copper on the surface of the core part electrochemically to make the chemical formulation of the core part near the surface region be of almost Pd.

On the contrary, in accordance with the electrode catalyst particle, the present inventors have found the fact that the effects of the present invention can be obtained by employing the structure where any common component is not contained in the core part and the first shell part, and have completed the present invention.

For instance, the lattice constants of WC (2.90 angstrom, 2.83 angstrom) are different from the lattice constant of Pd and the lattice constant of Pt.

In the instant description, when explaining the structure of the electrode catalyst, if necessary the wording "structure (main structural material) of the catalyst particle supported on a support/structure (main structural material) of a support having electric conductivity" is employed. More specifically, the wording "structure of shell part/structure of core part/structure of support" is employed. Furthermore specifically, the wording "structure of second shell part/structure of first shell/structure of care part/structure of support" is employed. For instance, when the electrode catalyst has a structure of "second shell part of Pt/first shell of Pd/core part of W carbide as a main component/support of electrically conductive carbon", the wording "Pt/Pd/WC/C" is employed.

In addition, in the electrode catalyst (N2) in accordance with the present invention, the core part may further contain a W oxide within the scope where the effects of the present invention can be obtained.

Provided that, from the viewpoint to ensure an enough electric conductivity, the formulation of the structural components of the care particle which is a raw material (raw material of the core) of the electrode catalyst in accordance with the present invention preferably satisfies the equation (4) mentioned hereinafter.

Further, in the electrode catalyst (N3) in accordance with the present invention, the core part may further contain simple W within the scope where the effects of the present invention can be obtained.

Further, in accordance with the present invention, there can be provided an electrode catalyst (N4) in accordance with any one of (N1) to (N3), wherein a percentage $R1_{Pt}$ (atom %) of the simple Pt and a percentage $R1_{Pd}$ (atom %) of the simple Pd in an analytical region near a surface measured by X-ray photoelectron spectroscopy (XPS) satisfy the conditions of the following equation (1).

$$0.60 \leq (R1_{Pt}/R1_{Pd}) \leq 6.00 \quad (1)$$

When the electrode catalyst is so configured that the above $(R1_{Pt}/R1_{Pd})$ is 0.60 more, since a percentage of the part of simple Pt having a high catalyst activity on the surface of the electrode catalyst is increased, the effects of the present invention can be obtained more reliably. When the electrode catalyst is so configured that the above $(R1_{Pt}/R1_{Pd})$ is 6.00 or less, since a content of simple Pt in the second shell part can be decreased, the effects of the present invention can be obtained more reliably In the present invention, from the viewpoint to improve more reliably the catalyst activity (particularly the initial Pt mass activity mentioned after) in comparison with conventional Pt/C, the $(R1_{Pt}/R1_{Pd})$ is preferably 0.60 or more and less than 1.15.

Further, in the present invention, from the viewpoint to improve more reliably the durability (particularly a value of "ECSA after evaluation test"/"initial ECSA before evaluation test" in the durability evaluation mentioned after) in comparison with conventional Pt/C, the $(R1_{Pt}/R1_{Pd})$ is preferably 1.15 or more and 6.00 or less.

In accordance with the present invention, when calculating the percentage $R1_{Pt}$ (atom %) of simple Pt and the percentage $R1_{Pd}$ (atom %) of simple Pd by XPS, the numerical value are calculated so that the sum of the three components including the percentages of the two components and the percentage $R1_W$ of W derived from the W compound mentioned after is 100%. Namely, in the analytical region near a surface of the electrode catalyst, a percentage of carbon (atom %) detected other than the simple Pt, the simple Pd and the W compound is omitted from the calculation.

In the present invention, XPS is measured under the following (A1) to (A6) conditions.

(A1) X-ray source: Monochromatic AlKα

(A2) Photoelectron taking out angle: θ=75° C. (referring the following FIG. 3)

(A3) Charge correction: Correcting on the basis that R1s peak energy is 284.8 eV (A4) Analytical region: 200 μm (A5) Chamber pressure at analyzing: about $1\times10^{-6}$ Pa In addition, in accordance with the present invention, there can be provided an electrode catalyst (N5) in accordance with (N4), wherein the $R1_{Pt}$ is 35 atom % or more. Thereby, since a percentage of the part of simple Pt having a high catalyst activity on the surface of the electrode catalyst is increased, the effects of the present invention can be obtained more reliably.

In the present invention, from the viewpoint to improve more reliably the catalyst activity (particularly the initial Pt mass activity mentioned after) in comparison with conventional Pt/C, the $R1_{Pt}$ is preferably 35 to 48 atm %.

Further, in the present invention, from the viewpoint to improve more reliably the durability (particularly a value of "ECSA after evaluation test"/"initial ECSA before evaluation test" in the durability evaluation mentioned after) in comparison with conventional Pt/C, the $R1_{Pt}$ is preferably 40 atm % or more, more preferably 50 atm % or more.

In addition, in accordance with the present invention, there can be provided an electrode catalyst (N6) in accordance with (N4) or (N), wherein the $R1_{Pd}$ is 60 atom % or less. Thereby, a percentage of the part where simple Pd is decreased on the surface of the electrode catalyst, and thus the elution of Pd can be reliably inhibited. Therefore, the effects of the present invention such as further improvement of the durability (particularly a value of "ECSA after evaluation test"/"initial ECSA before evaluation test" in the durability evaluation mentioned after) can be obtained reliably. From the same point of view, $P1_{Pd}$ is preferably 36 atom % or less, more preferably 26 atom % or less.

In addition, in accordance with the present invention, there can be provided an electrode catalyst (N7) in accordance with any one of (N4) to (N6), wherein a percentage of W derived from the W compound $R1_W$ in an analytical region near a surface measured by X-ray photoelectron spectroscopy (XPS) is 30 atom % or less.

Thereby, the part where the core part is exposed on the electrode catalyst is decreased, and thus the surface area of the second shell part and the first shell part which contribute the promotion of the electrode reaction can be increased. Thus, the effects of the present invention can be obtained more reliably.

In addition, in accordance with the present invention, there can be provided an electrode catalyst (N8) in accordance with any one of (N1) to (N7), wherein a support rate $L_{Pt}$ (wt %) of Pt and a support rate $L_{Pd}$ (wt %) of Pd measured by ICP light emission analysis satisfy the conditions of the following equation (2).

$$L_{Pt}/L_{Pd} \geq 0.30 \quad (2)$$

By configuring the electrode catalyst so as to satisfy the above equation (3), the amount to be used of Pt of the second shell part can be decreased and further the amount to be used of Pd of the first shell part can be also decreased, which results in contribution to low cost.

In the present invention, it is preferable that (N9) an average value of crystallite size of the crystal particle measured by powder X-ray diffraction (XRD) is 3 to 22.0 nm.

When the average value of the crystallite size is less than 3 nm, it is difficult to form the particles to be the core part on the support, and thus there tends largely to be difficult to form the catalyst particles on the support so as to have the first shell part and the second shell part and to satisfy the condition of the equation (1).

Further, when the average value of the crystallite size is more than 22.0 nm, it is quite difficult to form the particles to be the core part on the support under highly dispersing state, and thus there tends largely to be difficult to form the catalyst particles on the support so as to satisfy the condition of the equation (1).

In the present invention, in case that the first shell part is made of Pt, the second shell part is made of Pd and the first shell part composed of one layer to two layers, since the peak of Pt(111) plane cannot be observed by XRD, the average value calculated from the peak of Pd(111) plain of the second shell part is assumed to be an average value of the crystallite size of the catalyst particle.

In addition, in accordance with the present invention, there can be provided an electrode catalyst (N10) in accordance with any one of (N1) to (N10), wherein the catalyst is prepared by the step comprising a care particle forming step where the core particles containing the W carbide and the W oxide are formed on the support, a first shell part forming step where the first shell part is formed on at least one of the surface of the core particles obtained by the core particle forming step, and a second shell part forming step where the second shell part is formed on at least one of the surface of the first shell part obtained by the first shell part forming step, and with respect to the core particles obtained by the core particle forming step, a percentage $R0_{WC}$ (atom %) of the W carbide and a percentage $R0_{WO}$ (atom %) of the W oxide in an analytical region near a surface measured by X-ray photoelectron spectroscopy (XPS) satisfy the conditions of the following equation (3).

$$R0_{WC}/(R0_{WC}+R0_{WO}) \geq 0.10 \quad (3)$$

By adjusting the formulation of the structural components of the core part as a raw material, a percentage of the W carbide is increased, and thus the electric conductivity of the finally obtained core part of the present invention can be ensured more sufficiently.

From the same point of view, in the present invention (N10), (N11) it is preferable that the $R0_{WC}/(R0_{WC}+R0_{WO})$ further satisfies the condition of the following equation (4).

$$R0_{WC}/(R0_{WC}+R0_{WO}) \geq 0.25 \quad (4)$$

Moreover, from the same point of view, the $R0_{WC}/(R0_{WC}+R0_{WO})$ is preferably 0.30 or more, more preferably 0.40 or more, further preferably 0.50 or more, particularly preferably 0.70 or more.

In addition, the present invention provides a composition (N12) for forming gas diffusion electrode which contains the electrode catalyst in accordance with any one of the above (N1) to (N11).

Since the composition for forming gas diffusion electrode of the present invention contains the electrode catalyst of the present invention, it is possible to produce easily a gas diffusion electrode which has the catalyst activity (polarization property) and durability at a practically durable level and contributes to the low cost in comparison with the conventional Pt/C catalyst.

In addition, the present invention provides a gas diffusion electrode (N13) which comprises the electrode catalyst in accordance with any one of the above (N1) to (N11), or which is formed by using the composition for forming gas diffusion electrode which comprises the electrode catalyst in accordance with the above (N12).

The gas diffusion electrode of the present invention is configured by including the electrode catalyst of the present invention. Or, the gas diffusion electrode is formed by using the composition for forming gas diffusion electrode. Therefore, it is easy to produce a structure which has the catalyst activity (polarization property) and durability at a practically durable level and contributes to the low cost in comparison with the conventional Pt/C catalyst.

In addition, the present invention provides a membrane-electrode assembly (MEA) (N14) comprising the gas diffusion electrode in accordance with the above (N13).

Since the membrane-electrode assembly (MEA) of the present invention includes the gas diffusion electrode of the present invention, it is easy to produce a structure which has the cell property and durability at a practically durable level and contributes to the low cost in comparison with the conventional Pt/C catalyst.

In addition, the present invention provides a fuel cell stack (N15) comprising the membrane-electrode assembly (MEA) in accordance with the above (N14).

Since the membrane-electrode assembly (MEA) of the present invention includes the gas diffusion electrode of the present invention, it is easy to produce a structure which has the cell property and durability at a practically durable level and contributes to the low cost in comparison with the conventional Pt/C catalyst.

Effects of the Invention

In accordance with the present invention, the electrode catalyst which has the catalyst activity and durability at a practically durable level and contributes to the low cost in comparison with the conventional Pt/C catalyst can be provided.

In addition, in accordance with the present invention, there can be provided the composition for forming gas diffusion electrode, the gas diffusion electrode, the membrane-electrode assembly (MEA), and the fuel cell stack, which contain the above electrode catalyst can be provided.

MODE FOR CARRYING OUT THE INVENTION

Preferable embodiments of the present invention are described in detail hereunder with reference to the drawings when necessary <Electrode Catalyst>

Figure 1:
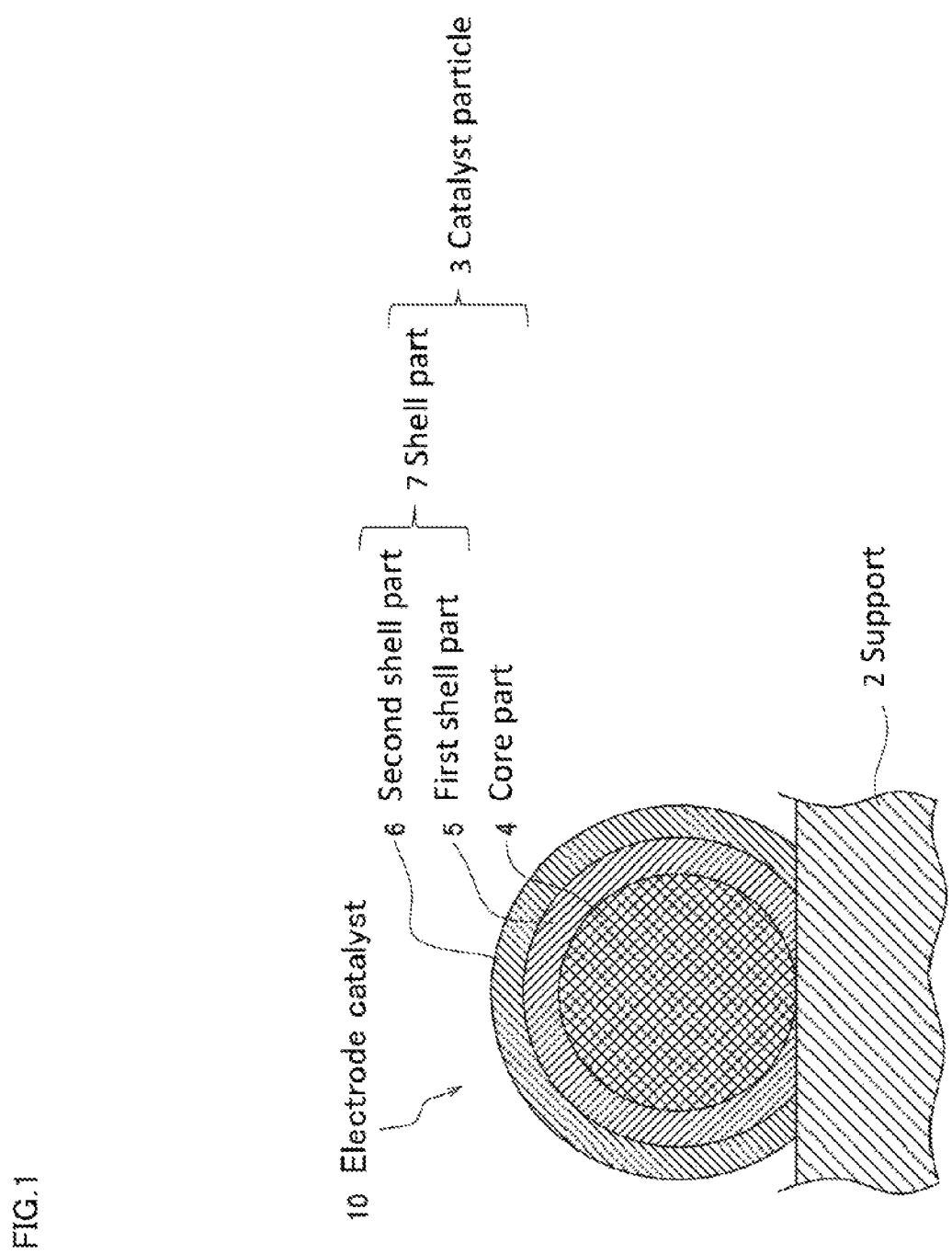
FIG. 1 is a schematic sectional view showing a preferred embodiment of the electrode catalyst of the present invention (core-shell catalyst).
Figure 2:
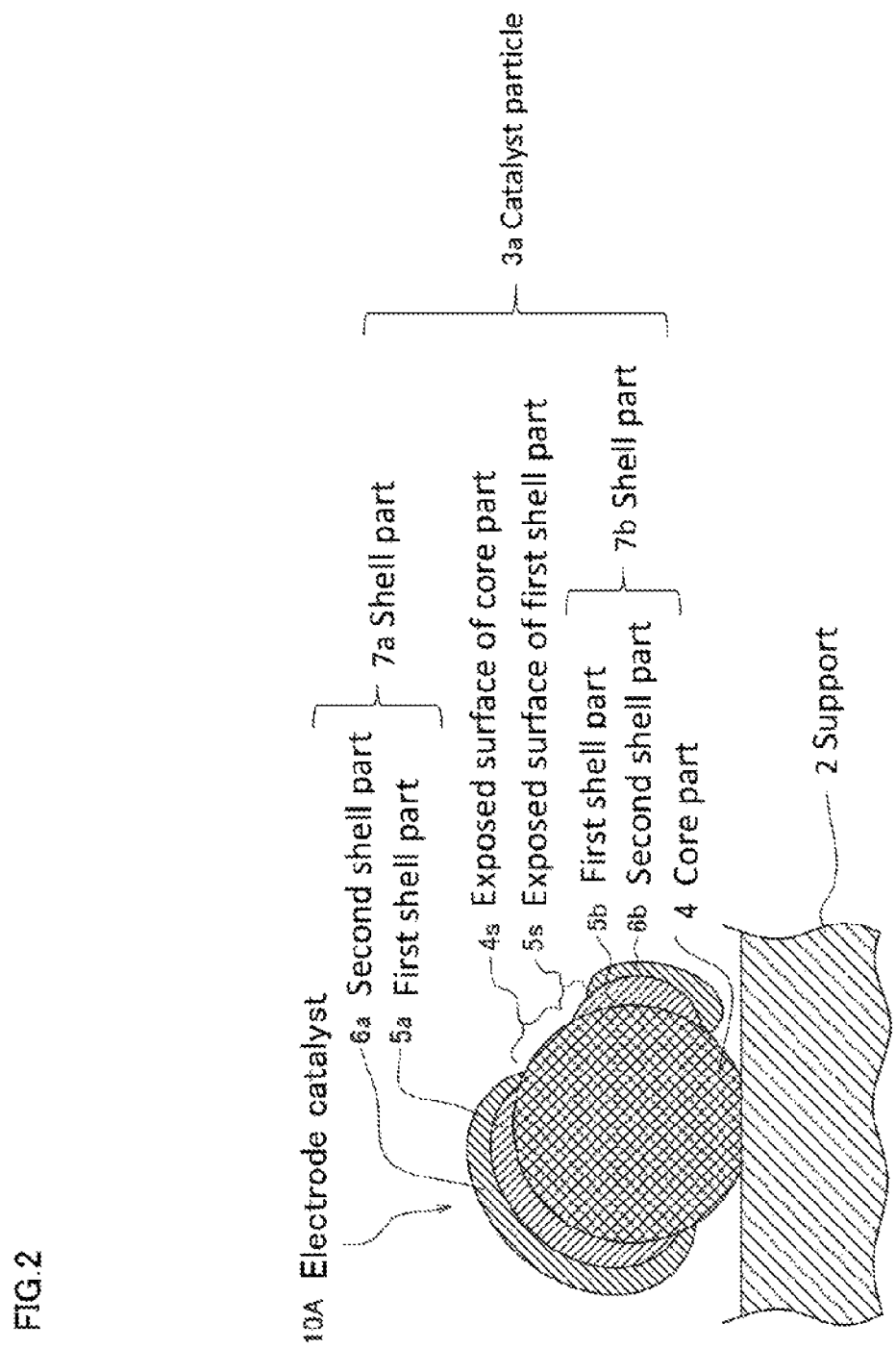
FIG. 2 is a schematic sectional view showing another preferred embodiment of the electrode catalyst of the present invention (core-shell catalyst).

FIG. 1 is a schematic cross-sectional view showing a preferable embodiment of an electrode catalyst (core-shell catalyst) of the present invention. And FIG. 2 is a schematic sectional view showing another preferred embodiment of the electrode catalyst of the present invention (core-shell catalyst).

Further as shown in FIG. 1, an electrode catalyst 10 of the present invention includes a support 2, and catalyst particles 3 supported on the support 2 and having a so-called "core-shell structure".

Further, the catalyst particle 3 has a so-called "core-shell structure" where a core part 4 firmed on the support 2, and a shell part 7 (first shell part 5 and second shell part 6) formed on the core part 4.

Namely, the electrode catalyst 10 has a structure that the core part 4 is supported on the support 2 as a nuclear (core), and the core part 4 is covered with the shell part 7 composed of the first shell part 5 and the second shell part 6.

In addition, the elements of the components (chemical composition) and the elements of the components (chemical composition) of the first shell part 5 and the second shell part 6 are different.

In accordance with the present invention, in the electrode catalyst, the shell part may be formed on at least a part of the surface of the core part.

For example, from the viewpoint to obtain the effects of the present invention more reliably, it is preferred that the electrode catalyst 10 be in a state where the almost of all range of the surface of the core part 4 is covered with the shell part 7, as shown in FIG. 1.

Further, as shown in FIG. 2, the electrode catalyst 1 may also be in a state where a part of the surface of the core part 4 is covered, and the rest part of the surface of the core part 4 is partially exposed (e.g. a state where a part 4s of the surface of the core part 4 shown in FIG. 2 being exposed), within the scope where the effects of the present invention can be obtained. In other words, as is the case with the electrode catalyst 10A shown in FIG. 2, the shell part 7a and the shell part 7b may be partially formed on a part of the surface of the core part 4.

In addition, in this case, as shown FIG. 2, it is preferred that the almost of all range of the surface of the first shell part 5a is covered with the second shell part 6a.

Further, as shown in FIG. 2, it may also be in a state where a part of the surface of the first shell part 5b is covered, and the surface of the first shell part 5b is partially exposed (e.g. a state where a part 5s of the surface of the first shell part 5b shown in FIG. 2 being exposed), within the scope where the effects of the present invention can be obtained.

In addition, the electrode catalyst of the present invention may be a state where the electrode catalyst 10 shown in FIG. 1 and the electrode catalyst 10A shown in FIG. 2 coexist in a mixed manner.

Further as shown in FIG. 2, within the scope where the effects of the present invention can be obtained, the electrode catalyst of the present invention may be in a state that the shell part 7a and the shell part 7b coexist in a mixed manner with respect to an identical core part 4, within the scope where the effects of the present invention can be obtained. In the present invention, only the shell part 7a exists with respect to an identical core part 4 or only the shell part 7b exists with respect to an identical core part 4 (none of these states are shown in the drawings).

Furthermore, within the scope where the effects of the present invention can be obtained, the electrode catalyst 1 may also be in a state where "particles only composed of the core part 4 that are not covered by the shell parts 7" are supported on the support 2 (not shown), in addition to at least one of the above electrode catalyst 10 and the electrode catalyst 10A.

Furthermore, within the scope where the effects of the present invention can be obtained, the electrode catalyst 1 may also be in a state where "particles only composed of the constituent element of the shell parts 7" are supported on the support 2 without being in contact with the core part 4 (not shown), in addition to at least one of the electrode catalyst 10 and the electrode catalyst 10A.

Furthermore, within the scope where the effects of the present invention can be obtained, the electrode catalyst 1 may also be in a state where "particles only composed of the care part 4 that are not covered by the shell parts 7" and "particles only composed of the constituent element of the shell parts 7" are individually supported, in addition to at least one of the electrode catalyst 10 and the electrode catalyst 10A.

As for the thicknesses of the first shell part 5 and the second shell part 6, a preferable range thereof is to be appropriately determined based on the design concept of the electrode catalyst.

For example, when the amount of the Pt to be used to compose the second shell part 6 is intended to be minimized, a layer composed of one atom (one atomic layer) is preferred, and in this case, when there is only one kind of metal element composing the second shell part 6, it is preferred that the thickness of the second shell part 6 be twice as large as the diameter of one atom of such metal element (provided that an atom is considered as a sphere).

Further when the metal elements contained in the second shell part 6 is two or more, it is preferred that the second shell part 6 has a thickness equivalent to that of a layer composed of one atom (one atomic layer formed with two or more kinds of atoms being provided in the surface direction of the core part 4).

If the durability of the electrode catalyst is to be further improved by making the thickness of the second shell part 6 larger the thickness is preferably 1 to 5 nm, more preferably 2 to 10 nm.

Here, in the present invention, "average particle size" refers to an average value of the diameters of an arbitrary number of particles as particle groups that are observed through electron micrographs.

The thickness of the first shell part 5 is preferably the thickness of the second shell part 6 or less. Therefore, it is preferable, because the amount of Pd to be used can be deceased, and the eluted amount of Pd can also be decreased when using as an electrode catalyst.

There are no particular restrictions on the support 2, as long as such being capable of supporting the complexes composed of the core parts 4 and the first shell part 5 and the second shell part 6, and has a large surface area.

Moreover, it is preferred that the support 2 be that exhibiting a favorable dispersibility and a superior electrical conductivity in a composition used to form a gas diffusion electrode having the electrode catalyst 1.

The support 2 may be appropriately selected from carbon-based materials such as glassy carbon (GC), fine carbon, carbon black, graphite, carbon fiber, activated carbon, ground product of activated carbon, carbon nanofiber and carbon nanotube; and glass-based or ceramic-based materials such as oxides.

Among these materials, carbon-based materials are preferred in terms of their adsorptivities with respect to the core part 4 and in terms of a BET specific surface area of the support 2.

Further, as a carbon-based material, an electrically conductive carbon is preferred, and particularly an electrically conductive carbon black is preferred as an electrically conductive carbon.

Examples of such electrically conductive carbon black include products by the names of "Ketjenblack EC300 J," "Ketjenblack EC600" and "Carbon EPC" (produced by Lion Corporation).

The core part 4 has a structure that a W compound contains at least a W carbide. It is preferred that the core part is configured by a W compound containing at least a W carbide from the viewpoint to obtain the effects of the present invention more reliably. As the W compound, a W oxide may further be contained other than the W carbide. When containing a component other than the W compound, preferable is the simple W Furthermore, as the W compound, when a W oxide may further be contained other than the W carbide, from the viewpoint to obtain enough electric conductivity more reliably it is preferred that the core part 4 has a percentage $R0_{WC}$ (atom %) of the W carbide and a percentage $R0_{WO}$ (atom %) of the W oxide in an analytical region near a surface measured by X-ray photoelectron spectroscopy (XPS) which satisfy the conditions of the following equation (3).

$$R0_{WC}/(R0_{WC}+R0_{WO}) \geq 0.10 \qquad (3)$$

From the same point of view, in such a case, it is preferable that the $R0_{WC}/(R0_{WC}+R0_{WO})$ satisfies the condition of the following equation (4).

$$R0_{WC}/(R0_{WC}+R0_{WO}) \geq 0.25 \qquad (4)$$

Moreover, from the same point of view, the $R0_{WC}/(R0_{WC}+R0_{WO})$ is preferably 0.30 or more, more preferably 0.40 or more, further preferably 0.50 or more, particularly preferably 0.70 or more.

The simple Pd is contained in the first shell part 5. From the viewpoint to obtain the effects of the present invention more reliably, and from the viewpoint to produce easily, etc., the first shell part 5 is preferably made so as to have the simple Pd as a main component (50 wt % or more), and more preferably made of the simple Pd.

The simple Pt is contained in the second shell part 6. From the viewpoint to obtain the effects of the present invention more reliably, and from the viewpoint to produce easily, etc., the first shell part 6 is preferably made so as to have the simple Pt as a main component (50 wt % or more), and more preferably made of the simple Pt.

From the viewpoint to obtain the effects of the present invention more reliably it is preferred that the electrode catalyst 10 and the electrode catalyst 10A satisfy the following condition.

Namely, it is preferred that in the electrode catalyst 10 and the electrode catalyst 10A, a percentage $R1_{Pt}$ (atom %) of the simple Pt and a percentage $R1_{Pd}$ (atom %) of the simple Pd in an analytical region near a surface measured by X-ray photoelectron spectroscopy (XPS) satisfy the conditions of the following equation (1).

$$0.60 \leq (R1_{Pt}/R1_{Pd}) \leq 6.00 \qquad (1)$$

When the electrode catalyst 10 and the electrode catalyst 10A are so configured that the $(R1_{Pt}/R1_{Pd})$ is 0.60 or more, since a percentage of the part of simple Pt having a high catalyst activity on the surface of the electrode catalyst is increased, the effects of the present invention can be obtained more reliably. When the electrode catalyst is so configured that the $(R1_{Pt}/R1_{Pd})$ is 6.00 or less, since a content of simple Pt in the second shell part can be decreased, the effects of the present invention can be obtained more reliably From the viewpoint to improve more reliably, the catalyst activity (particularly the initial Pt mass activity mentioned after) of the electrode catalyst 10 and the electrode catalyst 10A in comparison with conventional Pt/C, the $(R1_{Pt}/R1_{Pd})$ is preferably 0.60 or more and less than 1.15.

Further, from the viewpoint to improve more reliably the durability (particularly a value of "ECSA after evaluation test"/"initial ECSA before evaluation test" in the durability evaluation mentioned after) of the electrode catalyst 10 and the electrode catalyst 10A in comparison with conventional Pt/C, the $(R1_{Pt}/R1_{Pd})$ is preferably 1.15 or more and 6.00 or less.

In this case, the electrode catalyst 10 and the electrode catalyst 10A preferably have a $R1_{Pt}$ of 35 atom % or more. From the viewpoint to improve more reliably, the catalyst activity (particularly the initial Pt mass activity mentioned after) of the electrode catalyst 10 and the electrode catalyst 10A in comparison with conventional Pt/C, the $R1_{Pt}$ is preferably 35 to 48 atm %.

Further, from the viewpoint to improve more reliably the durability (particularly a value of "ECSA after evaluation test"/"initial ECSA before evaluation test" in the durability evaluation mentioned after) of the electrode catalyst 10 and the electrode catalyst 10A in comparison with conventional Pt/C, the $R1_{Pt}$ is preferably 40 atm % or more, more preferably 50 atm % or more.

Further, in this case, the $R1_{Pd}$ is preferably 60 atom % or less. From the viewpoint to improve more reliably the durability (particularly a value of "ECSA after evaluation test"/"initial ECSA before evaluation test" in the durability evaluation mentioned after) of the electrode catalyst 10 and the electrode catalyst 10A in comparison with conventional Pt/C, the $R1_{Pd}$ is preferably 36 atom % or less, more preferably 26 atom % or less.

Furthermore, in this case, a percentage $R1_W$ of W derived from the W compound in an analytical region near a surface measured by the XPS is preferably 30 atom % or less.

In this case, it is preferred that a support rate $L_{Pt}$ (wt %) of Pt and a support rate $L_{Pd}$ (wt %) of Pd measured by ICP light emission analysis satisfy the conditions of the following equation (2).

$$L_{Pt}/L_{Pd} \geq 0.30 \qquad (2)$$

In the present invention, the X-ray photoelectron spectroscopy (XPS) is measured under the following (A1) to (A5) conditions.

(A1) X-ray source: Monochromatic AlKα

(A2) Photoelectron taking out angle: θ=75° C.

Figure 3:
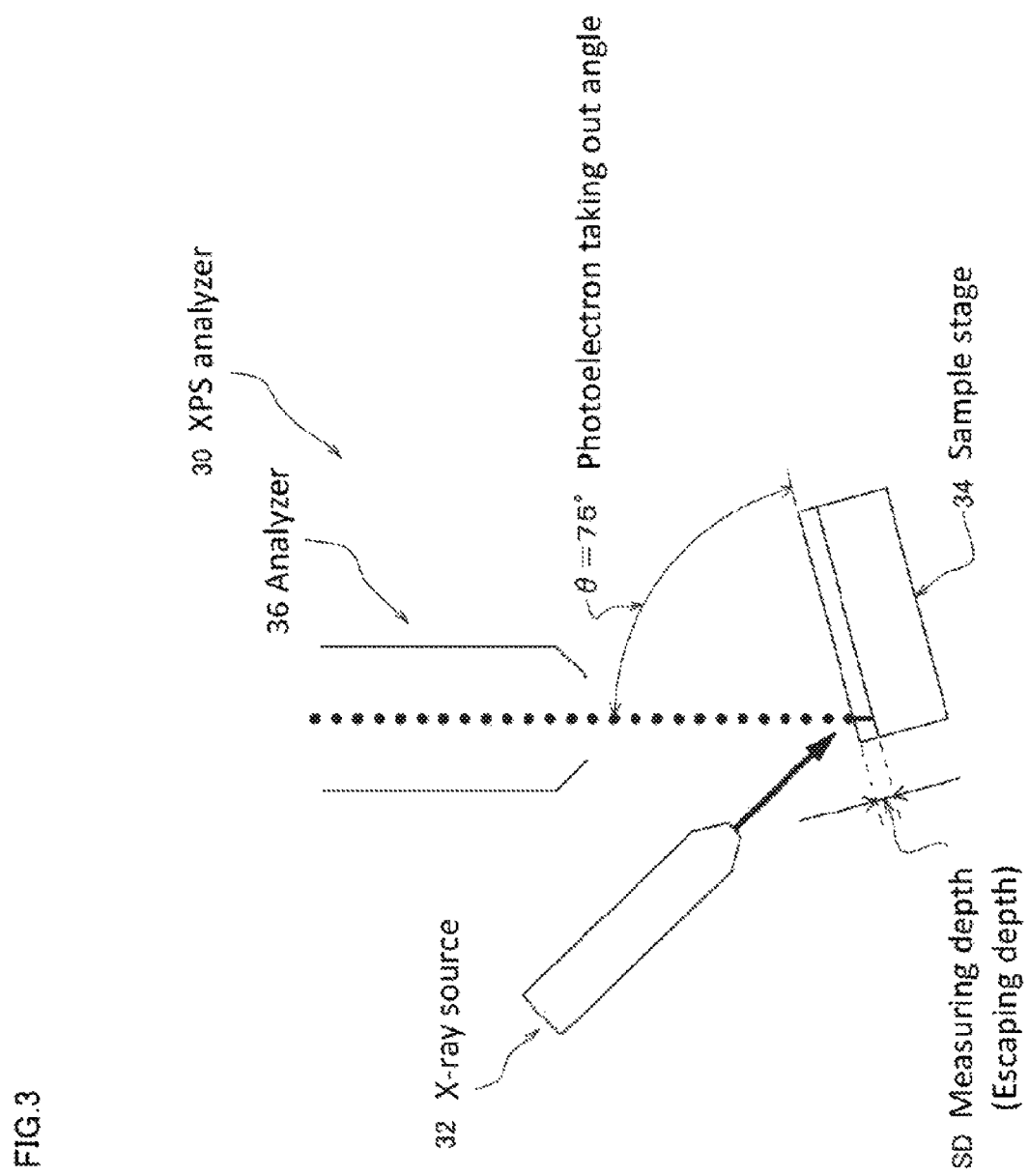
FIG. 3 is a schematic diagram showing a brief structure of the XPS machine to explain the analytical conditions of the X-ray photoelectron spectroscopy (XPS) in the present invention.

(A3) Charge correction: Correcting on the basis that R1s peak energy is 284.8 eV (A4) Analytical region: 200 μm (A5) Chamber pressure at analyzing: about $1 \times 10^{-6}$ Pa Here, the photoelectron taking out angle θ of (A2) is an angle θ, as shown in FIG. 3, when a X-ray emitted from an X-ray source 32 is irradiated to a sample set an a sample stage 34, and a photoelectron emitted from the sample is received by a spectroscope 36. Namely the photoelectron taking out angle θ corresponds to an angle of the light receiving axis of the spectroscope 36 to the surface of the layer of the sample on the sample stage 34.

<Preparation Method of the Electrode Catalyst>

The preparation method of the electrode catalyst 10 (10A) include the "core particle forming step" where the core particles containing the W carbide and the W oxide are formed on the support, the "first shell part forming step" where the first shell part 5 (5a, 5b) is formed on at least one of the surface co the core particles obtained by the core particle forming step, and the "second shell part forming step" where the second shell part 6 (6a, 6b) is formed on at least one of the surface of the first shell part obtained by the first shell part forming step.

The electrode catalyst 10 (10A) is produced by supporting the catalyst particles 3 (3a) of the catalyst component of the electrode catalyst, that is, the core part 4, the first shell part 5 (5a, 5b), and the second shell part 6 (6a, 6b) on the support 2 in this order.

The preparation method of the electrode catalyst 10 (10A) is not particularly limited as long as the method allows the catalyst particles 3 (3a) of the catalyst component to be supported on the support 2.

Examples of the production method of the electrode catalyst precursor include an impregnation method where a solution containing the catalyst component is brought into contact with the support 2 to impregnate the support 2 with the catalyst components; a liquid phase reduction method where a reductant is put into a solution containing the catalyst component; an electrochemical deposition method such as under-potential deposition (UPD); a chemical reduction method; a reductive deposition method using adsorption hydrogen; a surface leaching method of alloy catalyst; immersion plating; a displacement plating method; a sputtering method; and a vacuum evaporation method.

Provided that, in the "core particle forming step", it is preferable to regulate the raw materials, blend ratios of the raw materials, reaction conditions of the synthetic reactions, and the like by combining the aforementioned known techniques or the like so as to satisfy the aforementioned condition of the equation (5).

In addition, in the "first shell forming step" and the "second shell forming step", it is preferable to regulate the raw materials, blend ratios thereof, reaction conditions of the synthetic reactions, and the like by combining the aforementioned known techniques or the like so as to satisfy at least one of the aforementioned conditions of the equations (1) to (3).

Furthermore, the core particle obtained through the "core particle forming step" may be subjected to the treatment that the W oxide on the surface of the core particle is decreased before forming the first shell part in the "first shell forming step". For example, there are the reduction treatment of the surface of the core particle, the treatment of removing the W oxide by using an acid, and the like.

As a method for preparing the electrode catalyst 10 and the electrode catalyst 10A so as to satisfy the preferred conditions such as the conditions shown by the above equations (1) to (5), for example, there is a method where the chemical formulation and structure of the resulting product (catalyst) are analyzed by various known analytical techniques, the obtained analyzed data are fed back to the production process, and then the raw materials to be selected, the blend ratios of the raw materials, the synthetic reaction to be selected, the reaction conditions of the selected synthetic reaction, and the like are regulated and varied, and the like.

<Structure of Fuel Cell>

Figure 4:
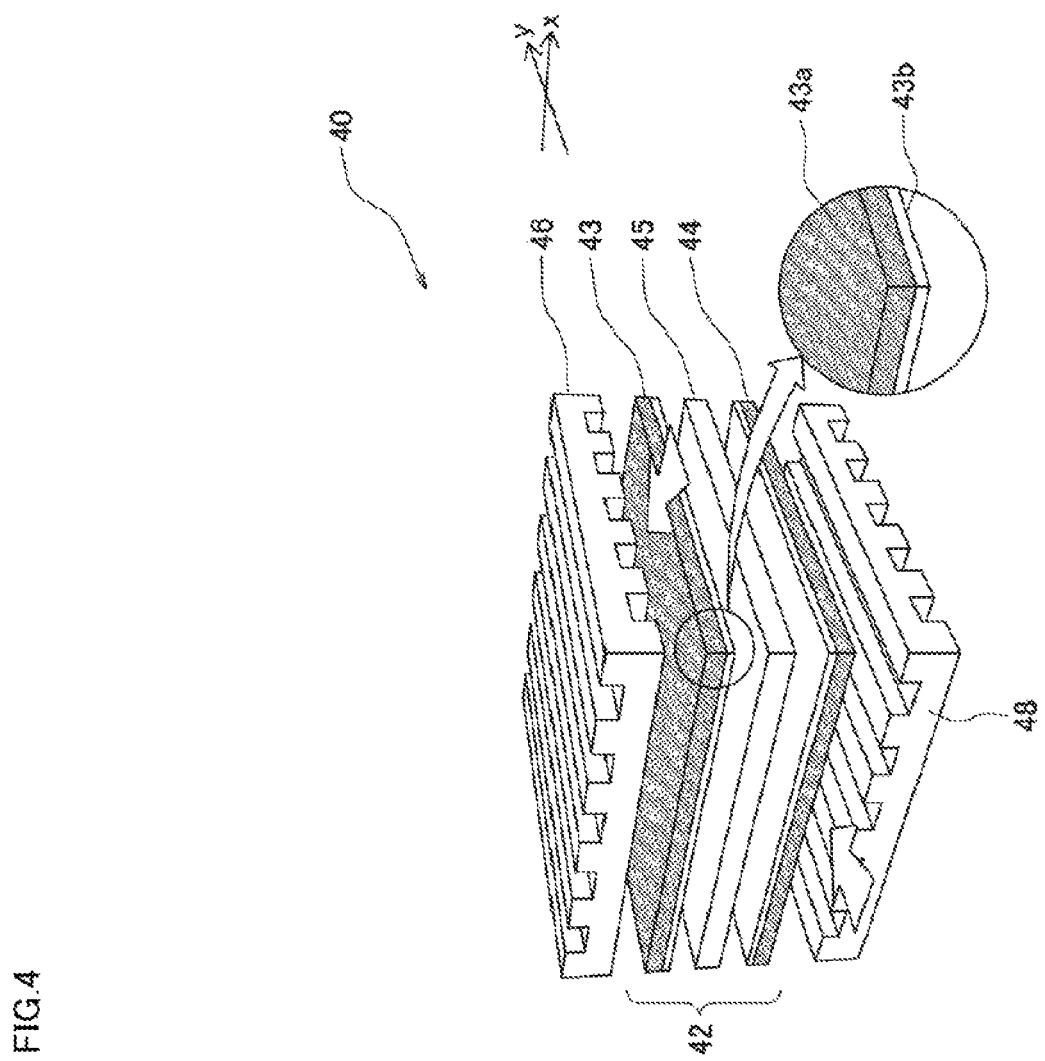
FIG. 4 is a schematic diagram showing a preferred embodiment of a fuel cell stack of the present invention.

FIG. 4 is a schematic view showing preferable embodiments of a composition for forming gas diffusion electrode containing the electrode catalyst of the present invention; a gas diffusion electrode produced using such composition for forming gas diffusion electrode; a membrane-electrode assembly (Membrane Electrode Assembly: hereinafter referred to as "MEA" as needed) having such gas diffusion electrode; and a fuel cell stack having such MEA.

The fuel cell stack 40 shown in FIG. 4 has a structure where the MEA 42 is one-unit cell, and the multiple layers of such one-unit cells are stacked.

Further, the fuel cell stack 40 has the MEA 42 that is equipped with an anode (negative electrode) 43 of the gas diffusion electrode, a cathode (positive electrode) 44 of the gas diffusion electrode, and an electrolyte membrane 45 provided between these electrodes.

Furthermore, the fuel cell stack 40 has a structure where the MEA 42 is sandwiched between a separator 46 and a separator 48.

Described hereunder are the composition for forming gas diffusion electrode, the anode 43 and cathode 44 of the gas diffusion electrode, the MEA 42, all of which serve as members of the fuel cell stack 40 containing the electrode catalyst of the present invention.

<Composition for Forming Gas Diffusion Electrode>

The electrode catalyst of the present invention can be used as a so-called catalyst ink component and serve as the composition for forming gas diffusion electrode in the present invention.

One feature of the composition for forming gas diffusion electrode of the present invention is that this composition contains the electrode catalyst of the present invention.

The main components of the composition for forming gas diffusion electrode are the aforementioned electrode catalyst and an ionomer solution. The composition of the ionomer solution is not particularly limited. For example, the ionomer solution may contain a polyelectrolyte exhibiting a hydrogen ion conductivity, water and an alcohol The polyelectrolyte contained in the ionomer solution is not particularly limited. Examples of such polyelectrolyte include known perfluorocarbon resins having sulfonate group, carboxylic acid group. As an easily obtainable hydrogen ion-conductive polyelectrolyte, there can be listed, for example, Nafion (registered trademark of Du Pont), ACIPLEX (registered trademark of Asahi Kasei Chemical Corporation) and Flemion (registered trademark of ASAHI GLASS Co., Ltd).

The composition for forming gas diffusion electrode can be produced by mixing, crushing and stirring the electrode catalyst and the ionomer solution.

The composition for forming gas diffusion electrode may be prepared using crushing and mixing machines such as a ball mill and/or an ultrasonic disperser. A crushing and a stirring condition at the time of operating a crushing and mixing machine can be appropriately determined in accordance with the mode of the composition for forming gas diffusion electrode.

The composition of each of the electrode catalyst, water, alcohol and hydrogen ion-conductive polyelectrolyte that are contained in the composition for forming gas diffusion electrode may be set so as to be that capable of achieving a favorable dispersion state of the electrode catalyst, allowing the electrode catalyst to be distributed throughout an entire catalyst layer of the gas diffusion electrode and improving the power generation performance of the fuel cell.

<Gas Diffusion Electrode>

The anode 43 of the gas diffusion electrode has a structure having a gas diffusion layer 43a and a catalyst layer 43b which is provided on the surface of the gas diffusion layer 43a at an electrolyte membrane 45 side.

The cathode 44 has, in the same manner as the anode 43, a structure having a gas diffusion layer (not shown) and a catalyst layer (not shown) which is provided an the surface of the gas diffusion layer at an electrolyte membrane 45 side.

The electrode catalyst of the present invention may be contained in the catalyst layer of at least one of the anode 43 and the cathode 44.

The gas diffusion electrode can be used as an anode, and also can be used as a cathode.

(Electrode Catalyst Layer)

In the case of the anode 43, the catalyst layer 43b serves as a layer where a chemical reaction of dissociating a hydrogen gas sent from the gas diffusion layer 43a into hydrogen ions takes place due to the function of the electrode catalyst 10 contained in the catalyst layer 43b. Further, in the case of the cathode 44, the catalyst layer 43b serves as a layer where a chemical reaction of bonding an air (oxygen gas) sent from the gas diffusion layer 43a and the hydrogen ions that have traveled from the anode through the electrolyte membrane takes place due to the function of the electrode catalyst 10 contained in the catalyst layer 43b.

The catalyst layer 43b is formed using the abovementioned composition for forming gas diffusion electrode. It is preferred that the catalyst layer 43b have a large surface area such that the reaction between the electrode catalyst 10 and the hydrogen gas or air (oxygen gas) sent from the diffusion layer 43a is allowed to take place enough. Moreover, it is preferred that the catalyst layer 43b be formed in a manner such that the catalyst layer has a uniform thickness as a whole. The thickness of the catalyst layer 43b can be appropriately adjusted and is not particularly limited, and preferably is 2 to 200 μm.

(Gas Diffusion Layer)

The gas diffusion layer equipped to the anode 43 of the gas diffusion electrode and the cathode 44 of the gas diffusion electrode serves as a layer provided to diffuse to each of the corresponding catalyst layers the hydrogen gas introduced from outside the fuel cell stack 40 into gas flow passages that are formed between the separator 46 and the anode 43, and the air (axygen gas) introduced into gas passages that are formed between the separator 48 and the cathode 44.

In addition, the gas diffusion layer plays a role of supporting the catalyst layer so as to immobilize the catalyst layer to the surface of the gas diffusion electrode.

The gas diffusion layer has a function of favorably passing the hydrogen gas or air (oxygen gas) and then allowing such hydrogen gas or air to arrive at the catalyst layer. For this reason, it is preferred that the gas diffusion layer have a water-repellent property. For example, the gas diffusion layer has a water repellent component such as polyethylene terephthalate (PTFE).

There are no particular restrictions on a material that can be used in the gas diffusion layer, and there can be employed a material known to be used in a gas diffusion layer of a fuel cell electrode. For example, there may be used a carbon paper; or a material made of a carbon paper as a main raw material and an auxiliary raw material applied to the carbon paper as the main raw material, such auxiliary raw material being composed of a carbon powder as an optional ingredient, an ion-exchange water also as an optional ingredient and a polyethylene terephthalate dispersion as a binder. The thickness of the gas diffusion layer can be appropriately determined based on, for example, the size of a cell used in a fuel cell.

The anode 43 of the gas diffusion electrode and the cathode 44 of the gas diffusion electrode may have an intermediate layer (not shown) between the gas diffusion layer and the catalyst layer (Production Method of Gas Diffusion Electrode)

A production method of the gas diffusion electrode is now explained. The gas diffusion electrode of the present invention may be produced so that the electrode catalyst of the present invention is a structural component of the catalyst layer, and the method of production is not particularly limited, and any known production method can be employed.

For example, the gas diffusion electrode may be produced through a step of applying the composition for forming gas diffusion electrode which contains the electrode catalyst, the hydrogen ion-conductive polyelectrolyte and the ionomer to the gas diffusion layer, and a step of drying such gas diffusion layer to which the composition for forming gas diffusion electrode has been applied to form the catalyst layer.

<Membrane-Electrode Assembly (MEA)>

The MEA 42 of the preferred embodiment of the MEA in accordance with the present invention shown in FIG. 4 has a structure having the anode 43, the cathode 44 and the electrolyte membrane 45. The MEA 42 has a structure where at least one of the anode and the cathode has the gas diffusion electrode containing the electrode catalyst of the present invention.

The MEA 42 can be produced by stacking the anode 43, the electrolyte 300, and the cathode 44 in this order, and then bonded under pressure.

<Fuel Cell Stack>

When one-unit cell (single cell) has a structure where the separator 46 is disposed an the outer side of the anode 43 of the MEA 42 and the separator 48 is disposed on the outer side of the cathode 44, the fuel cell stack 40 of the preferred embodiment of the fuel cell stack in accordance with the present invention shown in FIG. 4 is composed of only one-unit cell (single cell) or an integrated structure of two or more (not shown).

The fuel cell system is completed by attaching peripheral devices to the fuel cell stack 40 and assembling them.

EXAMPLE

In the following, the present invention is more specifically explained by referring working examples, but the present invention is not limited to the following working examples.

19

(I) Prevision of Electrode Catalyst for Examples and Comparative Examples

Example 1

Production of Electrode Catalyst

["Pt/Pd/W/C" Powder where the Second Shell Part of Pt is Formed on Pd/W/C]

A "Pt/Pd/W/C" powder {Trade name "NE-F12W10-AAA", available from N.E.CHEMCAT} where the second shell part consisting of Pt is formed on Pd of the particle of the following "Pd/W/C" powder was prepared as an electrode catalyst of Example 1.

This Pt/Pd/W/C powder was obtained by preparing a mixed solution of the following Pd/W/C powder and potassium chloroplatinate and water, and adding a reducing agent thereto, and then reducing Pt ion in the solution.

["Pd/W/C" Powder where the First Shell Part of Pd is Formed on W/C]

A "Pd/W/C" powder {Trade name "NE-F02W00-AA", available from N.E.CHEMCAT} where the first shell part consisting of Pd is formed on W of the particle of the following "W/C" powder was prepared.

This Pd/W/C powder was obtained by preparing a mixed solution of the following W/C powder and sodium tetrachloropalladate(II) and water, and adding a reducing agent thereto, and then reducing palladium ion in the solution.

[Core Particle Supporting Carbon "W/C" Powder]

A "W/C" powder {Trade name "NE-F00W00-A", available from N.E.CHEMCAT} where the core particles consisting of the W carbide and the W oxide are supported on a carbon black powder was prepared.

As mentioned after, it was confirmed, as a result of the XPS analysis, that the W/C powder contained the W carbide and the W oxide in ratios [$R0_{WC}/(R0_{WC}+R0_{WO})$] shown in TABLE 1.

The W/C powder was prepared by heat-treating a powder containing a commercially available carbon black powder (specific surface area of 750 to 850 m$^2$/g) and a commercially available tungstate salt and a commercially available water-soluble polymer (carbon source) under a reduction atmosphere.

As a result of the XRD analysis, it was confirmed that the core particle of the W/C powder was composed of the following W carbides and W oxide. Namely, the W carbides were WC, $W_2C$, $WC_{1-x}$ (0<x<1), and the W oxide was $WO_3$.

<Surface Analysis of Electrode Catalyst by X-Ray Photoelectron Spectroscopy (XPS)>

With respect to the electrode catalyst of Example 1, the surface analysis was conducted by the XPS to measure the percentage $R1_{Pt}$ (atom %) of the simple Pt, the percentage $R1_{Pd}$ (atom %) of the simple Pd, and the percentage $R1_W$ (atom %) of W derived from the W compounds (the above W carbides and W oxide).

Specifically, the analysis was conducted by using "Quantera SXM" (available from ULVAC-PHI, Inc.) as the XPS machine under the following conditions (A1) X-ray source: Monochromatic AlKα

(A2) Photoelectron taking out angle: θ=75° C. (referring FIG. 3)

(A3) Charge correction: Correcting on the basis that R1s peak energy is 284.8 eV (A4) Analytical region: 200 μm (A5) Chamber pressure at analyzing: about 1×10$^{-6}$ Pa (A6) Measuring depth (Escaping depth): about 5 nm or less

20

The results of the analysis are shown in TABLE 1. When calculating the percentage $R1_{Pt}$ (atom %) of simple Pt, the percentage $R1_{Pd}$ (atom %) of simple Pd and the percentage $R1_W$ (atom %) of W derived from the W compound, the numerical value are calculated so that the sum of the three components is 100%. Namely, in the analytical region near a surface of the electrode catalyst, a percentage of carbon (atom %) detected other than the simple Pt, the simple Pd and the W compound is omitted from the calculation.

<Measurement (ICP Analysis) of Support Rate>

With respect to the electrode catalyst of Example 1, the support rate $L_{Pt}$ (wt %) of Pt, the support rate $L_{Pd}$ (wt %) of Pd and the support rate $L_W$ (wt %) of W were measured by the following method.

The electrode catalyst of Example 1 was immersed in an aqua regia to dissolve the metal. Then, carbon as an insoluble component was removed from the aqua regia. Next, the aqua regia from which carbon has been removed was subjected to ICP analysis.

The results of the analysis are shown in TABLE 1.

<Surface Analysis of Core Particle by X-Ray Photoelectron Spectroscopy (XPS)>

The core particle which was a raw material of the electrode catalyst of Example 1 was subjected to surface analysis by the XPS to measure the percentage $R0_{WC}$ (atom %) of the W carbide and the percentage $R0_{WO}$ (atom %) of the W oxide.

Specifically, the analysis was conducted by using "Quantera SXM" (available from ULVAC-PHI, Inc.) as a XPS apparatus under the same analysis conditions (A1) to (A6) as those of the XPS analysis of the above catalyst particle.

The results of the analysis are shown in TABLE1.

<Surface Observation and Structural Observation of Electrode Catalyst>

With respect to the electrode catalyst of Example 1, as a result of confirming STEM-HAADF image and EDS elemental mapping image, it was confirmed that the electrode catalyst had a structure where the catalyst particles having a core-shell structure where a layer of Pd of the first shell part was formed on at least a part of surface of the particle of the core part of the W carbide and the W oxide and a layer of the second shell part of Pt was formed on at least a part of the surface of the layer of the first shell part were supported on the electrically conductive carbon support (referring to FIG. 1, FIG. 2).

Example 2 to Example 5

The electrode catalysts of Example 2 to Example 5 were produced by employing the same preparation conditions and the same raw materials except that the amounts of the raw materials to be used and the reaction conditions, and the like were controlled slightly so that the catalyst had the results of the XPS analysis of the surface of the electrode catalyst ($R1_{Pt}$, $R1_{Pd}$, $R1_W$), the results of the ICP analysis of the whole electrode catalyst ($L_{Pt}$, $L_{Pd}$, $L_W$), and the results of the XPS analysis of the surface of the core particle {($R0_{WC}/(R0_{WC}+R0_{WO})$} shown in TABLE 1.

The XPS analysis and the ICP analysis were conducted in the same conditions as Example 1.

Further, with respect to the electrode catalysts of Examples 2 to 5, as a result of confirming STEM-HAADF image and EDS elemental mapping image, it was confirmed that the electrode catalyst had a structure where the catalyst particles having a core-shell structure where a layer of Pd of the first shell part was formed on at least a part of surface of the particle of the core part of the W carbide and the W oxide and a layer of the second shell part of Pt was formed on at least a part of the surface of the layer of the first shell part were supported on the electrically conductive carbon support (referring to FIG. 1, FIG. 2).

Example 6

Production of Electrode Catalyst

["Pt/Pd/W/C" Powder where the Second Shell Part of Pt is Formed on Pd/W/C]

A "Pt/Pd/W/C" powder {Trade name "NE-G12W10-AAA", available from N.E.CHEMCAT} where the second shell part consisting of Pt is formed an Pd of the particle of the following "Pd/W/C" powder was prepared as an electrode catalyst of Example 6.

This Pt/Pd/W/C powder was obtained by preparing a mixed solution of the following Pd/W/C powder and potassium chloroplatinate and water, and adding a reducing agent thereto, and then reducing Pt ion in the solution.

["Pd/W/C" Powder where the First Shell Part of Pd is Formed on W/C]

A "Pd/W/C" powder {Trade name "NE-G02W00-AA", available from N.E.CHEMCAT} where the first shell part consisting of Pd is formed on W of the particle of the following "W/C" powder was prepared.

This Pd/W/C powder was obtained by preparing a mixed solution of the following W/C powder and sodium tetrachloropalladate(II) and water, and adding a reducing agent thereto, and then reducing palladium ion in the solution.

[Care Particle-Supporting Carbon "W/C" Powder]

A "W/C" powder {Trade name "NE-G00W00-A", available from N.E.CHEMCAT} where the core particles consisting of the W carbide and the W oxide are supported on a carbon black powder was prepared.

As mentioned after, it was confirmed, as a result of the XPS analysis, that the W/C powder contained the W carbide and the W oxide in ratios [$RO_{WC}/(RO_{WC}+RO_{WO})$] shown in TABLE 2.

The W/C powder was prepared by heat-treating a powder containing a commercially available carbon black powder (specific surface area of 200 to 300 m$^2$/g) and a commercially available tungstate salt and a commercially available water-soluble polymer (carbon source) under a reduction atmosphere.

As a result of the XRD analysis, it was confirmed that the core particle of the W/C powder was composed of the following W carbides and W oxide. Namely, the W carbides were WC, $W_2C$, $WC_{1-x}$ (0<x<1), and the W oxide was $WO_3$.

The electrode catalyst of Example 6 was subjected to the XPS analysis of the surface of the electrode catalyst, the ICP analysis and the XPS analysis of the core particle under the same conditions as those of the electrode catalyst of Example 1. Respective results are shown in TABLE 2.

Next, with respect to the electrode catalyst of Example 6, as a result of confirming STEM-HAADF image and EDS elemental mapping image, it was confirmed that the electrode catalyst had a structure where the catalyst particles having a core-shell structure where a layer of Pd of the first shell part was formed on at least a part of surface of the particle of the core part of the W carbide and the W oxide and a layer of the second shell part of Pt was formed on at least a part of the surface of the layer of the first shell part were supported on the electrically conductive carbon support (referring to FIG. 1, FIG. 2).

Example 7 to Example 11

The electrode catalysts of Example 7 to Example 11 were produced by employing the same preparation conditions and the same raw materials except that the amounts of the raw materials to be used and the reaction conditions, and the like were controlled slightly so that the catalyst had the results of the XPS analysis of the surface of the electrode catalyst ($R1_{Pt}$, $R1_{Pd}$, $R1_W$), the results of the ICP analysis of the whole electrode catalyst ($L_{Pt}$, $L_{Pd}$, $L_W$), and the results of the XPS analysis of the surface of the core particle {$RO_{WC}/(RO_{WC}+RO_{WO})$} shown in TABLE 2.

The XPS analysis and the ICP analysis were conducted in the same conditions as Example 1.

Further, with respect to the electrode catalysts of Example 7 to Example 11, as a result of confirming STEM-HAADF image and EDS elemental mapping image, it was confirmed that the electrode catalyst had a structure where the catalyst particles having a core-shell structure where a layer of Pd of the first shell part was formed on at least a part of surface of the particle of the core part of the W carbide and the W oxide and a layer of the second shell part of Pt was formed on at least a part of the surface of the layer of the first shell part were supported on the electrically conductive carbon support (referring to FIG. 1, FIG. 2).

Example 12

Production of Electrode Catalyst

["Pt/Pd/W/C" Powder where the Second Shell Part of Pt is Formed on Pd/W/C]

A "Pt/Pd/W/C" powder {Trade name "NE-G12W09-ADB", available from N.E.CHEMCAT} where the second shell part consisting of Pt is formed on Pd of the particle of the following "Pd/W/C" powder was prepared as an electrode catalyst of Example 12.

This Pt/Pd/W/C powder was obtained by preparing a mixed solution of the following Pd/W/C powder and potassium chloroplatinate and water, and adding a reducing agent thereto, and then reducing Pt ion in the solution.

["Pd/W/C" Powder where the First Shell Part of Pd is Formed on W/C]

A "Pd/W/C" powder {Trade name "NE-G02W00-DB", available from N.E.CHEMCAT} where the first shell part consisting of Pd is formed on W of the particle of the following "W/C" powder was prepared.

This Pd/W/C powder was obtained by preparing a mixed solution of the following W/C powder and sodium tetrachloropalladate(II) and water, and adding a reducing agent thereto, and then reducing palladium ion in the solution.

[Core Particle Supporting Carbon "W/C" Powder]

A "W/C" powder {Trade name "NE-G02W00-B", available from N.E.CHEMCAT} where the core particles consisting of the W carbide and the W oxide are supported on a carbon black powder was prepared.

The W/C powder was prepared by heat-treating a powder containing a commercially available carbon black powder (specific surface area of 200 to 300 m$^2$/g) and a commercially available tungstate salt under a reduction atmosphere containing a hydrocarbon gas (carbon source).

As a result of the XRD analysis, it was confirmed that the care particle of the W/C powder was composed of the following simple W, W carbide and W oxide. Here, the W carbide was WC, and the W oxide was $WO_3$.

The electrode catalyst of Example 12 was also subjected to the XPS analysis and the ICP analysis under the same conditions as those of the electrode catalyst of Example 1. The results are shown in TABLE 3.

With respect to the electrode catalyst of Example 12, as a result of confirming STEM-HAADF image and EDS elemental mapping image, it was confirmed that the electrode catalyst had a structure (referring to FIG. 1, FIG. 2).

Example 13 to Example 21

The electrode catalysts of Example 13 to Example 21 were produced by employing the same preparation conditions and the same raw materials except that the amounts of the raw materials to be used and the reaction conditions, and the like were controlled slightly so that the catalyst had the results of the XPS analysis of the surface of the electrode catalyst (R1$_{Pt}$, R1$_{Pd}$, R1$_W$), the results of the ICP analysis of the whole electrode catalyst (L$_{Pt}$, L$_{Pd}$, L$_W$), and the results of the XPS analysis of the surface of the core particle {R0$_{WC}$/(R0$_{WC}$+R0$_{WO}$)} shown in TABLE 3.

The XPS analysis and the ICP analysis were conducted in the same conditions as Example 12.

Further, with respect to the electrode catalysts of Example 13 to Example 21, as a result of confirming STEM-HAADF image and EDS elemental mapping image, it was confirmed that the electrode catalyst had a structure where the catalyst particles having a core-shell structure where a layer of Pd of the first shell part was formed on at least a part of the surface of the particle of the core part of the W carbide and the W oxide and a layer of the second shell part of Pt was formed on at least a part of the surface of the layer of the first shell part were supported on the electrically conductive carbon support (referring to FIG. 1, FIG. 2).

Example 22

Production of Electrode Catalyst

["Pt/Pd/W/C" Powder where the Second Shell Part of Pt is Formed on Pd/W/C]

A "Pt/Pd/W/C" powder {Trade name "NE-G12W09-ACB", available from N.E.CHEMCAT} where the second shell part consisting of Pt is formed on Pd of the particle of the following "Pd/W/C" powder was prepared as an electrode catalyst of Example 22.

This Pt/Pd/W/C powder was obtained by preparing a mixed solution of the following Pd/W/C powder and potassium chloroplatinate and water, and adding a reducing agent thereto, and then reducing Pt ion in the solution.

["Pd/W/C" Powder where the First Shell Part of Pd is Formed an W/C]

A "Pd/W/C" powder {Trade name "NE-G02W00-CB", available from N.E.CHEMCAT} where the first shell part of Pd is formed on W of the particle of the following "W/C" powder was prepared.

This Pd/W/C powder was obtained by preparing a mixed solution of the following W/C powder and sodium tetrachloropalladate(II) and water, and adding thereto a reducing agent other than the reducing agent added in Example 1 to Example 21, and then reducing palladium ion in the solution.

[Care Particle Supporting Carbon "W/C" Powder]

A "W/C" powder {Trade name "NE-G00W00-B", available from N.E.CHEMCAT} where the core particles consisting of the W carbide and the W oxide are supported on a carbon black powder was prepared.

The W/C powder was prepared by heat-treating a powder containing a commercially available carbon black powder (specific surface area of 200 to 300 m$^2$/g) and a commercially available tungstate salt under a reduction atmosphere containing a hydrocarbon gas (carbon source).

As a result of the XRD analysis, it was confirmed that the core particle of the W/C powder was composed of the following simple W, W carbide and W oxide. Here, the W carbide was WC, and the W oxide was WO$_3$.

The electrode catalyst of Example 22 was also subjected to the XPS analysis and the ICP analysis under the same conditions as those of the electrode catalyst of Example 1. The results are shown in TABLE 3.

With respect to the electrode catalyst of Example 22, as a result of confirming STEM-HAADF image and EDS elemental mapping image, it was confirmed that the electrode catalyst had a structure (referring to FIG. 1, FIG. 2).

Comparative Example 1

As the Pt/C catalyst, a Pt/C catalyst having a support rate of 50 wt % available from N.E. CHEMCAT (Trade name: "NE-F50") was provided. This catalyst is produced from the same raw materials as those of the electrode catalyst in Example 1.

Comparative Example 2

Production of Electrode Catalyst

["Pt/Pd/C" Powder where the Second Shell Part of Pt is Formed an Pd/C]

A "Pt/Pd/C" powder {Trade name "NE-F01215-BC", available from N.E.CHEMCAT} where the shell part consisting of Pt is formed on Pd of the particle of the following "Pd/W/C" powder was prepared as an electrode catalyst of Comparative Example 2.

This Pt/Pd/C powder was obtained by preparing a mixed solution of the following Pd/C powder and potassium chloroplatinate and water, and adding a reducing agent thereto, and then reducing Pt ion in the solution.

[Core Particle-Supporting Carbon "Pd/C" Powder]

A "Pd/C" powder {Trade name "NE-F00200-C", available from N.E.CHEMCAT} where the core particle consisting of Pd was supported on the carbon black powder was prepared.

This Pd/C powder was obtained by preparing a mixed solution of a commercially available carbon black powder (specific surface area 750 to 850 m$^2$/g), sodium tetrachloropalladate(II) and water, and adding thereto a reducing agent, and then reducing palladium ion in the solution.

The electrode catalyst of Comparative Example 2 was also subjected to the XPS analysis and the ICP analysis under the same conditions as those of the electrode catalyst of Example 1. The results are shown in TABLE 1.

With respect to the electrode catalyst of Example 12, as a result of confirming STEM-HAADF image and EDS elemental mapping image, it was confirmed that the electrode catalyst had a structure where the catalyst particles having a core-shell structure where a layer of Pt of the shell part was formed an at least a part of the surface of the particle of the core part of the Pd were supported on the electrically conductive carbon support.

Comparative Example 3

As the Pt/C catalyst, a Pt/C catalyst having a support rate of 30 wt % available from N.E. CHEMCAT (Trade name: "NE-G30") was provided. This catalyst is produced from the same raw materials as those of the electrode catalyst in Examples 6 to 22.

Comparative Example 4

Production of Electrode Catalyst

["Pt/W/C" Powder where the Second Shell Part of Pt is Formed on W/C]

A "Pd/W/C" powder {Trade name "NE-G01W10-AA", available from N.E.CHEMCAT} where the first shell part consisting of Pd is formed on W of the particle of the following "W/C" powder was prepared as an electrode catalyst of Comparative Example 4.

This Pt/W/C powder was obtained by preparing a mixed solution of the following W/C powder and potassium chloroplatinate and water, and adding a reducing agent thereto, and then reducing Pt ion in the solution.

[Care Particle-Supporting Carbon "W/C" Powder]

A "W/C" powder {Trade name "NE-G00W00-A", available from N.E.CHEMCAT} where the core particles consisting of the W carbide and the W oxide are supported on a carbon black powder was prepared.

As mentioned after, it was confirmed, as a result of the XPS analysis, that the W/C powder contained the W carbide and the W oxide in ratios [$RO_{WC}/(RO_{WC}+RO_{WO})$] shown in TABLE 1.

The W/C powder was prepared by heat-treating a powder containing a commercially available carbon black powder (specific surface area of 200 to 300 $m^2/g$) and a commercially available tungstate salt and a commercially available water-soluble polymer (carbon source) under a reduction atmosphere.

As a result of the XRD analysis, it was confirmed that the core particle of the W/C powder was composed of the following W carbides and W oxide. Namely, the W carbides were WC, $W_2C$, $WC_{1-x}$ (0<x<1), and the W oxide was $WO_3$.

The electrode catalyst of Comparative Example 4 was subjected to the XPS analysis of the surface of the electrode catalyst, the ICP analysis and the XPS analysis of the core particle under the same conditions as those of the electrode catalyst of Example 1. Respective results are shown in TABLE 2 and TABLE 3.

Next, with respect to the electrode catalyst of Comparative Example 4, as a result of confirming STEM-HAADF image and EDS elemental mapping image, it was confirmed that the electrode catalyst had a structure where the catalyst particles having a core-shell structure where a layer of Pt of the shell part was formed on at least a part of the surface of the particle of the core part of the W carbide and the W oxide were supported on the electrically conductive carbon support.

Comparative Example 5

Production of Electrode Catalyst

["Pt/Pd/C" Powder where the Second Shell Part of Pt is Formed on Pd/C]

A "Pt/Pd/C" powder {Trade name "NE-G01215-BC", available from N.E.CHEMCAT} where the shell part consisting of Pt is formed on Pd of the particle of the following "Pd/W/C" powder was prepared as an electrode catalyst of Comparative Example 5.

This Pt/Pd/C powder was obtained by preparing a mixed solution of the following Pd/C powder and potassium chloroplatinate and water, and adding a reducing agent thereto, and then reducing Pt ion in the solution.

[Core Particle-Supporting Carbon "Pd/C" Powder]

A "Pd/C" powder {Trade name "NE-G00200-D", available from N.E.CHEMCAT} where the core particle consisting of Pd was supported on the carbon black powder was prepared.

This Pd/C powder was obtained by preparing a mixed solution of a commercially available carbon black powder (specific surface area 200 to 300 $m^2/g$), sodium tetrachloropalladate(II) and water, and adding thereto a reducing agent, and then reducing palladium ion in the solution.

The electrode catalyst of Comparative Example 5 was also subjected to the XPS analysis and the ICP analysis under the same conditions as those of the electrode catalyst of Example 1. The results are shown in TABLE 3.

With respect to the electrode catalyst of Comparative Example 5, as a result of confirming STEM-HAADF image and EDS elemental mapping image, it was confirmed that the electrode catalyst had a structure where the catalyst particles having a core-shell structure where a layer of Pt of the shell part was formed on at least a part of the surface of the particle of the core part of the Pd were supported on the electrically conductive carbon support.

(II) Production of Composition for Forming Gas Diffusion Electrode

A powder of each of the electrode catalysts of Example 1 to Example 22 and Comparative Example 1 to Comparative Example 5 was weighted by an amount of about 8.0 mg, and was put into a sample bottle together with 2.5 mL of an ultrapure water, followed by mixing the same while irradiating an ultrasonic wave to produce a slurry (suspension) of the electrode catalyst.

Next, there was prepared a Nafion-ultrapure water solution by mixing 10.0 mL of an ultrapure water and 20 µL of an aques dispersion of a 10 wt % Nafion (registered trademark) (product name "DE1020CS" by Wako Chemical Ltd.) in a different container.

2.5 mL of the Nafion-ultrapure water solution was slowly poured into the sample bottle containing the slurry (suspension) of the electrode catalyst, followed by thoroughly stirring the same at a room temperature for 15 min while irradiating an ultrasonic wave to obtain a composition for forming gas diffusion electrode.

(III) Formation of Electrode Layer on Electrode for Evaluation Test

For preparation of evaluation test of the electrode catalyst by a rotating disk electrode method (RDE method) mentioned after, a catalyst layer CL (referring to FIG. 5) containing a powder of the electrode catalyst of Example 1, a catalyst layer CL (referring to FIG. 5) containing a powder of the electrode catalyst of Example 2, a catalyst layer CL (referring to FIG. 5) containing a powder of the electrode catalyst of Comparative Example 1, and a catalyst layer CL (referring to FIG. 5) containing a powder of the electrode catalyst of Comparative Example 2 were formed on the electrode surface of a rotating disk electrode WE (referring FIG. 5) in accordance with the following manner.

Namely, the composition for forming gas diffusion electrode was taken out by an amount of 10 µL, and was dropped onto the clean surface of the rotating disk electrode WE. Thereafter, the composition was applied to the whole surface of the electrode of the rotating disk electrode WE to form a coating layer. The coating film made of the composition for forming gas diffusion electrode was dried under a temperature of 23PC and a humidity of 50% RH for 2.5 hours to form the catalyst layer CL on the surface of the rotating disk electrode WE.

(IV) Evaluation Test of Catalyst Activity of Electrode Catalyst

Next, by using the rotating disk WE where the catalyst layer CL including the electrode catalyst of Example 1 to Example 22 was formed and the rotating disk WE where the catalyst layer CL including the electrode catalyst of Comparative Example 1 to Comparative Example 5 was formed, the evaluation test of catalyst activity and the evaluation test of durability were conducted in accordance with the following manner.

In addition, a mass activity of platinum (Mass Act, mA/g-Pt) at +0.9 V (vs RHE) was measured by the rotating disk electrode method (RDE method) in accordance with the following manner

[Configuration of Rotating Disk Electrode Measuring Apparatus]

Figure 5:
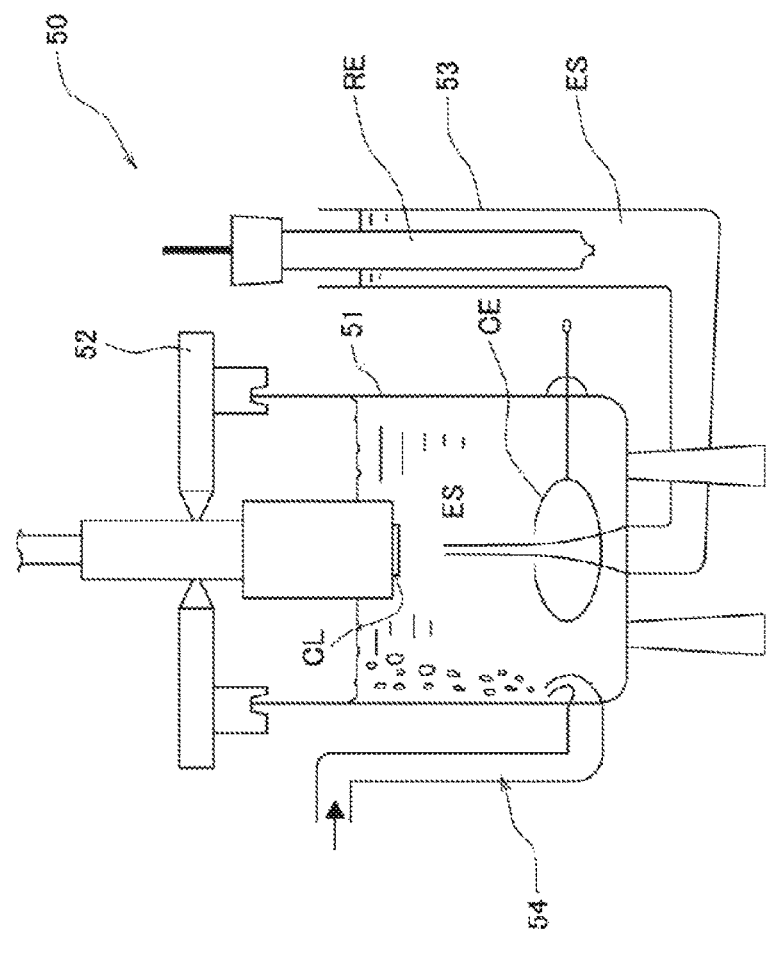
FIG. 5 is a schematic diagram showing a brief structure of the rotating disk electrode measuring machine provided with the rotating disk electrode used in the working examples.

FIG. 5 is a schematic diagram showing a schematic configuration of a rotating disk electrode measuring device 50 used in the rotating disk electrode method (RDE method).

As shown in FIG. 5, the rotating disk electrode measuring device 50 mainly includes a measuring cell 51, a reference electrode RE, a counter electrode CE, and a rotating disk electrode WE. In addition, when evaluating the catalyst, an electrolyte solution ES was added to the measuring cell 51.

The measuring cell 51 has almost cylindrical shape having an opening at the upper surface, and a fixing member 52 of the rotating disk electrode WE which is also a gas-sealable rid is disposed at the opening. At the center of the fixing member 52, a gas-sealable opening is disposed for inserting and fixing the main body of the electrode of the rotating disk electrode WE into the measuring cell 51.

On the side of the measuring cell 51, an almost L-shaped Luggin tube 53 is disposed. Further one end of the Luggin tube 53 has a Luggin capillary which can be inserted into the inside of the measuring cell 51, the electrolyte solution ES of the measuring cell 51 also enters to the inside of the Luggin tube 53. The other end of the Luggin tube 53 has an opening, and the reference electrode RE can be inserted into the Luggin tube 53 from the opening.

As the rotating disk electrode measuring apparatus 50, "Model HSV110" available from Hokuto Denko Corp. was used. AnAg/AgCl saturated electrode was used as the reference electrode RE, a Pt mesh with Pt black was used as the counter electrode CE, and an electrode having a diameter of 5.0 mmφ, area of 19.6 mm² available from Glassy Carbon Ltd. was used as the rotating disk electrode WE. Further, $HClO_4$ of 0.1 M was used as the electrolyte solution ES.

[Cleaning of Rotating Disk Electrode WE]

As shown in FIG. 5, after dipping the rotating disk electrode WE in the $HClO_4$ electrolyte solution ES within the above rotating disk electrode measuring apparatus 50, the oxygen in the electrolyte solution ES was purged for 30 minutes or more with an argon gas by introducing the argon gas from a gas introducing tube 54 which was connected to the side of the measuring cell 51 into the measuring cell 51.

Then, the sweeping was carried out for 20 cycles in the manner that the potential (vsRHE) of the rotating disk electrode WE to the reference electrode RE was so-called "potential sweeping mode of chopping waves" where the potential (vsRHE) of the rotating disk electrode WE to the reference electrode RE was +85 mV to +1085 mV, and a scanning rate was 50 mv/sec.

[Evaluation of Initial Electrochemical Area (ECSA)]

Figure 6:
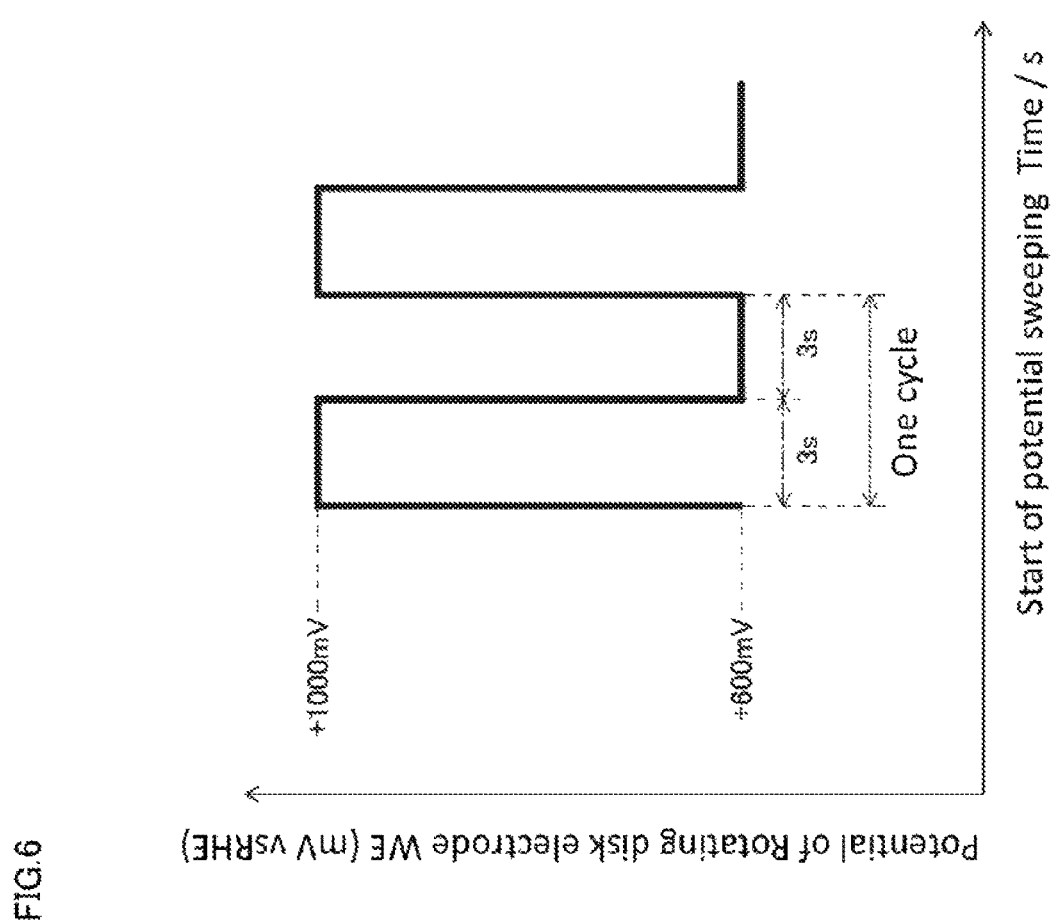
FIG. 6 is a graph showing the "potential sweep mode of rectangular wave" where the potential (vsRHE) of the rotating disk electrode WE with respect to the reference electrode RE in the working examples.

Next, the sweeping was carried out of in the manner that the potential (vsRHE) of the rotating disk electrode WE to the reference electrode RE was so-called "potential sweeping mode of rectangular waves" as shown in FIG. 6.

More specifically the potential sweeping where the following operations (A) to (D) were to be one cycle was carried out 6 cycles.

(A) Potential at the start of sweep: +600 mV, (B) Sweeping from +600 mV to +1000 mV, (C) Keeping at +1000 mV for 3 seconds, (D) Sweeping from +1000 mV to +400 mV, (E) Keeping at +600 mV for 3 seconds.

Next, the CV measurement was carried out for 3 cycles in the manner that the potential (vsRHE) of the rotating disk electrode WE was so-called "potential sweeping mode of chopping waves" where a potential at the start of measurement was +119 mV, +50 mV to +1200 mV, a scanning rate was 20 mv/sec. The rotation speed of the rotating disk electrode WE was 1600 rpm.

Next, after bubbling the electrolyte solution ES in the measuring cell 51 with an oxygen gas for 15 minutes or more, the CV measurement was carried out 10 cycles under the condition of so-called "potential sweeping mode of chopping waves" where the scanning potential was +135 mV to +1085 mV vsRHE, a scanning rate was 10 mV/sec, and the rotation speed of the rotating disk electrode WE was 1600 rpm.

The current value at a potential of the rotating disk electrode of +900 mV vsRHE was recorded.

In addition, by setting the rotation speed of the rotating disk electrode WE at 400 rpm, 625 rpm, 900 rpm, 1225 rpm, 2025 rpm, 2500 rpm, and 3025 rpm, the oxygen reduction (ORR) current measurement was carried out by one cycle.

Utilizing the results obtained from the CV measurement, the Pt mass activity (Mass ACT) (mA/μg-Pt@0.9V) was calculated.

The results obtained in Example 1 to Example 5, Comparative Example 1 and Comparative Example 2 are shown in TABLE 1.

The results obtained in Example 6 to Example 11, Comparative Example 3 and Comparative Example 4 are shown in TABLE 2.

The results obtained in Example 12 to Example 22, Comparative Example 3 to Comparative Example 5 are shown in TABLE 3.

In TABLE 1, the Pt mass activities (Mass ACT) of Example 1 to Example 5, Comparative Example 2 are shown as a relative value when the Pt mass activity (Mass ACT) of Comparative Example 1 (Pt/C catalyst) is 1.00.

In TABLE 2, the Pt mass activities (Mass ACT) of Example 6 to Example 11, Comparative Example 4 are shown as a relative value when the Pt mass activity (Mass ACT) of Comparative Example 3 (Pt/C catalyst) is 1.00.

In TABLE 3, the Pt mass activities (Mass ACT) of Example 12 to Example 22, Comparative Example 4 and Comparative Example 5 are shown as a relative value when the Pt mass activity (Mass ACT) of Comparative Example 3 (Pt/C catalyst) is 1.00.

(V) Evaluation Test of Durability of Electrode Catalyst

With respect to the rotating disk electrode WE that the catalyst layer CL containing the electrode catalyst of Example 1 to Example 22 other than the electrode catalyst used in the evaluation test of the catalyst activity, and the rotating disk electrode WE that the catalyst layer CL containing the electrode catalyst of Comparative Example 1 to Comparative Example 5, the ECSA was measured by the RDE method in the following manner to evaluate the durability

[Cleaning]

The same electrochemical treatment was carried out in the same manner as in the aforementioned evaluation test of the electrode catalyst.

(V-1) [Measurement of Initial ECSA]
(i) Potential Sweeping Treatment

The sweeping was carried out of in the manner that the potential (vsRHE) of the rotating disk electrode WE to the reference electrode RE was so-called "potential sweeping mode of rectangular waves" as shown in FIG. 6.

More specifically, the potential sweeping where the following operations (A) to (D) were to be one cycle was carried out 6 cycles.

(A) Potential at the start of sweep: +600 mV, (B) Sweeping from +600 mV to +1000 mV, (C) Keeping at +1000 mV for 3 seconds, (D) Sweeping from +1000 mV to +600 mV, (E) Keeping at +600 mV for 3 seconds.

(ii) CV Measurement

Next, the CV measurement was carried out 2 cycles in the manner that the potential (vsRHE) of the rotating disk electrode WE was so-called "potential sweeping mode of chopping waves" where a potential at the start of measurement was +119 mV, +50 mV to +1200 mV, a scanning rate was 50 mV/sec. The rotation speed of the rotating disk electrode WE was 1600 rpm.

From the result of the CV measurement of the second cycle, the initial ECSA value based on the hydrogen-attached and -detached waves was calculated. The results are shown in TABLE 1.

(V-2) [Measurement of ECSA after 12420 Cycles of Potential Sweeping]

Continued to the measurement of the initial ECSA, the above "(i) Potential sweeping treatment" was achieved in the same conditions except that number of the potential sweepings was 12 cycles. Next, the above "(ii) CV measurement" was achieved in the same conditions.

As mentioned above, the "(i) Potential sweeping treatment" was achieved by changing the number of the potential sweepings in the order, and every after the measurement, the above "(ii) CV measurement" was achieved in the same conditions. The number of the potential sweepings was changed in the order of 22, 40, 80, 160, 300, 600, 800, 1000, 1000, 8400 cycles.

By the measurement, the value of ECSA obtained in the final "(ii) CV measurement" (value of ECSA after carrying out the potential sweeping treatment i.e. total number of the potential sweepings being 12420 cycles) was calculated.

Further, the maintenance rate (%) of ECSA was calculated by dividing the value of ECSA based on the hydrogen-attached and -detached waves obtained in the final "(ii) CV measurement" by the "value of initial ECSA".

The results obtained in Example 1 to Example 5, Comparative Example 1 and Comparative Example 2 are shown in TABLE 1.

The results obtained in Example 6 to Example 11, Comparative Example 3 and Comparative Example 4 are shown in TABLE 2.

The results obtained in Example 12 to Example 22. Comparative Example 3 to Comparative Example 5 are shown in TABLE 3.

In TABLE 1, the values of initial ECSA of Example 1 to Example 5, Comparative Example 2 are shown as a relative value when the value of initial ECSA of Comparative Example 1 (Pt/C catalyst) is 1.00. Further, the values of maintenance rate of Example 1 to Example 5, Comparative Example 2 are shown as a relative value when the value of maintenance rate of Comparative Example 1 (Pt/C catalyst) is 1.00.

In TABLE 2, the values of initial ECSA of Example 6 to Example 11, Comparative Example 4 are shown as a relative value when the value of initial ECSA of Comparative Example 3 (Pt/C catalyst) is 1.00. Further, the values of maintenance rate of Example 6 to Example 11, Comparative Example 2 are shown as a relative value when the value of maintenance rate of Comparative Example 3 (Pt/C catalyst) is 1.00.

Further, in TABLE 3, the values of initial ECSA of each Example 12 to Example 22 and Comparative Example 3 to Comparative Example 5 are shown. In addition, in TABLE 3, the values of initial ECSA of Example 12 to Example 22, Comparative Example 4 and Comparative Example 5 are shown as a relative value when the value of initial ECSA of Comparative Example 3 (Pt/C catalyst) is 1.00. Furthermore, in TABLE 3, with respect to the measured value of ECSA after 12420 cycles of the potential sweepings, the value of Example 12 to Example 22, Comparative Example 4 and Comparative Example 5 are shown as a relative value (hereinafter referred to as "relative value X") when the value of Comparative Example 3 (Pt/C catalyst) is 1.00.

Further, with respect to Example 16 and Comparative Example 5, by taking out a part of the electrolyte solution ES in the measuring cell 51 just after the measurement of the value of initial ECSA, and a part of the electrolyte solution ES in the measuring cell 51 just after the measurement of the value of ECSA after potentially sweeping for 12420 cycles, amounts of Pd eluted from the electrode catalysts of Example 16 and Comparative Example 5 were measured by the ICP analysis. The obtained results are shown in TABLE 4. In TABLE 4, the relative value of the Pd eluted amount of Example 16 is shown when the Pd eluted amount of Comparative Example 5 (Pt/Pd/C catalyst) is 1.00.

TABLE 1

| Examples and Comparative Examples | Constitution of catalyst particle | XPS analysis result of catalyst particle surface | | | | ICP analysis result of entire catalyst particle | | | |
|---|---|---|---|---|---|---|---|---|---|
| | | $R1_{Pt}/$ atm % | $R1_{Pd}/$ atm % | $R1_{W}/$ atm % | $R1_{Pt}/R1_{Pd}$ | $L_{Pt}/$ wt % | $L_{Pd}/$ wt % | $L_{W}/$ wt % | $L_{Pt}/L_{Pd}$ |
| Ex. 1 | Pt/Pd/WC, WOx/C | 55.56 | 25.15 | 19.29 | 2.21 | 10.30 | 12.00 | 11.23 | 0.86 |
| Ex. 2 | Pt/Pd/WC, WOx/C | 54.43 | 16.96 | 28.61 | 3.21 | 9.82 | 9.79 | 14.74 | 1.00 |
| Ex. 3 | Pt/Pd/WC, WOx/C | 56.71 | 19.51 | 23.78 | 2.91 | 8.69 | 9.73 | 15.72 | 0.89 |
| Ex. 4 | Pt/Pd/WC, WOx/C | 55.01 | 26.00 | 18.96 | 2.12 | 7.68 | 9.61 | 16.22 | 0.80 |
| Ex. 5 | Pt/Pd/WC, WOx/C | 56.17 | 24.44 | 19.39 | 2.30 | 9.85 | 9.61 | 15.04 | 1.02 |
| Comp. Ex. 1 | Pt/C | 100.00 | 0.00 | 0.00 | — | 50.00 | 0.00 | 0.00 | — |

TABLE 1-continued

| | | | | | | | | |
|---|---|---|---|---|---|---|---|---|
| Comp. Ex. 2 | Pt/Pd/C | 未測定 | 未測定 | 0.00 | — | 17.28 | 24.21 | 0.00 | 0.71 |

| Examples and Comparative Examples | XPS analysis result of core particle surface $R0_{WC}/(R0_{WC} + R0_{WO})$ | Test result of performance evaluation | | | XPD analysis result of average particle size catalyst particle/nm (III) |
|---|---|---|---|---|---|
| | | Mass Act @0.9 V vs. RHE relative value | ECSA initial relative value | ECSA maintainance rate after 12420 relative value | |
| Ex. 1 | 0.10 | 1.00 | 0.97 | 1.14 | 12.90 |
| Ex. 2 | 0.31 | 1.00 | 0.87 | 1.33 | 15.40 |
| Ex. 3 | 0.49 | 0.88 | 0.97 | 1.42 | 16.70 |
| Ex. 4 | 0.64 | 1.00 | 0.82 | 1.14 | 18.40 |
| Ex. 5 | 0.61 | 1.06 | 1.06 | 1.25 | 14.70 |
| Comp. Ex. 1 | 0.00 | 1.00 | 1.00 | 1.00 | 2.70 |
| Comp. Ex. 2 | 0.00 | 4.83 | 1.97 | 1.12 | 4.80 |

TABLE 2

| Examples and Comparative Examples | Constitution of catalyst particle | XPS analysis result of catalyst particle surface | | | | ICP analysis result of entire catalyst particle | | | |
|---|---|---|---|---|---|---|---|---|---|
| | | $R1_{Pt}/$ atm % | $R1_{Pd}/$ atm % | $R1_{W}/$ atm % | $R1_{Pt}/R1_{Pd}$ | $L_{Pt}/$ wt % | $L_{Pd}/$ wt % | $L_{W}/$ wt % | $L_{Pt}/L_{Pd}$ |
| Ex. 6 | Pt/Pd/WC, WOx/C | 64.80 | 21.31 | 13.90 | 3.04 | 8.55 | 6.51 | 7.86 | 1.31 |
| Ex. 7 | Pt/Pd/WC, WOx/C | 58.11 | 22.08 | 10.79 | 2.63 | 4.75 | 8.48 | 5.42 | 0.56 |
| Ex. 8 | Pt/Pd/WC, WOx/C | 69.20 | 11.75 | 19.05 | 5.89 | 6.87 | 9.73 | 6.61 | 0.71 |
| Ex. 9 | Pt/Pd/WC, WOx/C | 52.90 | 18.14 | 28.97 | 2.92 | 5.90 | 6.15 | 7.69 | 0.96 |
| Ex. 10 | Pt/Pd/WC, WOx/C | 59.16 | 18.49 | 22.35 | 3.20 | 4.32 | 8.47 | 7.92 | 0.51 |
| Ex. 11 | Pt/Pd/WC, WOx/C | 40.80 | 35.49 | 23.70 | 1.15 | 3.51 | 10.70 | 5.93 | 0.33 |
| Comp. Ex. 3 | Pt/C | 100.00 | 0.00 | 0.00 | — | 30.40 | 0.00 | 0.00 | — |
| Comp. Ex. 4 | Pt/WC, WOx/C | 59.24 | — | 40.76 | — | 10.80 | — | 6.11 | — |

| Examples and Comparative Examples | XPS analysis result of core particle surface $R0_{WC}/(R0_{WC} + R0_{WO})$ | Test result of performance evaluation | | | XPD analysis result of average particle size catalyst particle/nm (III) |
|---|---|---|---|---|---|
| | | Mass Act @0.9 V vs. RHE relative value | ECSA initial relative value | ECSA maintainance rate after 12420 relative value | |
| Ex. 6 | 0.26 | 1.62 | 1.15 | 1.00 | 8.40 |
| Ex. 7 | 0.59 | 2.51 | 0.93 | 0.97 | 16.30 |
| Ex. 8 | 0.51 | 2.87 | 0.69 | 1.06 | 21.20 |
| Ex. 9 | 0.32 | 1.97 | 0.82 | 1.19 | 11.70 |
| Ex. 10 | 0.43 | 2.15 | 0.83 | 1.23 | 19.80 |
| Ex. 11 | 0.46 | 1.31 | 7.18 | 0.95 | 20.60 |
| Comp. Ex. 3 | 0.00 | 1.00 | 1.00 | 1.00 | 2.70 |
| Comp. Ex. 4 | 0.51 | 0.68 | 0.30 | 0.21 | 5.40 |

TABLE 3

| Examples and Comparative Examples | Constitution of catalyst particle | XPS analysis result of catalyst particle surface | | | | ICP analysis result of entire catalyst particle | | | |
|---|---|---|---|---|---|---|---|---|---|
| | | $R1_{Pt}/$ atm % | $R1_{Pd}/$ atm % | $R1_{W}/$ atm % | $R1_{Pt}/R1_{Pd}$ | $L_{Pt}/$ wt % | $L_{Pd}/$ wt % | $L_{W}/$ wt % | $L_{Pt}/L_{Pd}$ |
| Ex. 12 | Pt/Pd/WC, WOx/C | 37.13 | 47.08 | 15.79 | 0.79 | 9.21 | 8.46 | 5.84 | 1.10 |
| Ex. 13 | Pt/Pd/WC, WOx/C | 47.02 | 42.19 | 10.79 | 1.11 | 8.58 | 8.10 | 4.78 | 1.06 |
| Ex. 14 | Pt/Pd/WC, WOx/C | 36.79 | 47.53 | 15.68 | 0.77 | 9.51 | 8.45 | 5.87 | 1.13 |
| Ex. 15 | Pt/Pd/WC, WOx/C | 36.92 | 45.79 | 17.29 | 0.81 | 9.54 | 8.32 | 5.92 | 1.15 |

TABLE 3-continued

| | | | | | | | | | |
|---|---|---|---|---|---|---|---|---|---|
| Ex. 16 | Pt/Pd/WC, WOx/C | 36.75 | 47.73 | 15.51 | 0.77 | 9.30 | 8.61 | 5.78 | 1.08 |
| Ex. 17 | Pt/Pd/WC, WOx/C | 41.91 | 48.81 | 9.28 | 0.86 | 9.50 | 8.61 | 6.54 | 1.10 |
| Ex. 18 | Pt/Pd/WC, WOx/C | 43.73 | 50.26 | 6.01 | 0.87 | 14.55 | 16.20 | 5.76 | 0.90 |
| Ex. 19 | Pt/Pd/WC, WOx/C | 41.22 | 52.14 | 6.65 | 0.79 | 15.26 | 25.20 | 5.19 | 0.61 |
| Ex. 20 | Pt/Pd/WC, WOx/C | 36.16 | 57.70 | 6.14 | 0.63 | 17.50 | 23.80 | 3.11 | 0.74 |
| Ex. 21 | Pt/Pd/WC, WOx/C | 36.42 | 56.42 | 7.15 | 0.65 | 18.10 | 22.90 | 3.23 | 0.79 |
| Ex. 22 | Pt/Pd/WC, WOx/C | 35.76 | 59.45 | 4.79 | 0.60 | 15.90 | 24.90 | 3.46 | 0.64 |
| Comp. Ex. 3 | Pt/C | 100.00 | 0.00 | 0.00 | — | 30.40 | 0.00 | 0.00 | — |
| Comp. Ex. 4 | Pt/WC, WOx/C | 59.24 | 0.00 | 40.76 | — | 10.80 | — | 6.11 | — |
| Comp. Ex. 5 | Pt/Pd/C | | | | | 18.29 | 21.51 | 0.00 | 0.85 |

| Examples and Comparative Examples | XPS analysis result of core particle surface $R0_{WC}/(R0_{WC} + R0_{WO})$ | Test result of performance evaluation | | | Relative value to ECSA Pt/C after 12420 cycles | XPD analysis result of average particle size Catalyst particle/nm (III) |
|---|---|---|---|---|---|---|
| | | Mass Act @0.9 V vs. RHE relative value | ECSA initial m²/gPt | ECSA initial relative value | | |
| Ex. 12 | 0.78 | 3.56 | 161.80 | 2.44 | 1.89 | 4.10 |
| Ex. 13 | 0.76 | 2.59 | 118.40 | 1.79 | 1.38 | 5.00 |
| Ex. 14 | 0.78 | 3.08 | 149.30 | 2.26 | 1.64 | 4.00 |
| Ex. 15 | 0.78 | 3.72 | 120.50 | 1.82 | 1.63 | 4.40 |
| Ex. 16 | 0.78 | 4.86 | 127.50 | 1.93 | 1.43 | 4.80 |
| Ex. 17 | 1.00 | 3.15 | 150.10 | 2.27 | 1.94 | 4.80 |
| Ex. 18 | 0.80 | 3.31 | 136.84 | 2.07 | 1.80 | 6.50 |
| Ex. 19 | 0.80 | 3.46 | 131.71 | 1.99 | 1.53 | 9.00 |
| Ex. 20 | 0.72 | 2.00 | 176.20 | 2.66 | 2.07 | 5.00 |
| Ex. 21 | 0.72 | 2.46 | 146.70 | 2.22 | 1.78 | 5.00 |
| Ex. 22 | 0.72 | 4.00 | 166.20 | 2.51 | 2.32 | 5.90 |
| Comp. Ex. 3 | 0.00 | 1.00 | 66.20 | 1.00 | 1.00 | 2.70 |
| Comp. Ex. 4 | 0.51 | 0.69 | 19.70 | 0.30 | 0.06 | 5.40 |
| Comp. Ex. 5 | 0.00 | 4.54 | 91.40 | 1.38 | 1.19 | 5.00 |

TABLE 4

| | Construction | Pd eluted amount relative value |
|---|---|---|
| Ex. 16 | Pt/Pd/WC, WOx/C | 0.54 |
| Comp. Ex. 5 | Pt/Pd/C | 1.00 |

From the results of the Pt mass activity (Mass ACT) shown in TABLE 1 to TABLE 3, in comparison with the electrode catalysts (conventional Pt/C catalyst) of Comparative Example 1 and Comparative Example 3, it has been clear that the electrode catalysts of Example 1 to Example 22 had the same or more of the Pt mass activity and also had the same or more of the initial values of ECSA, and had a catalyst activity at a practically durable level.

Particularly, it has been clear that the electrode catalysts ($R1_{Pt}/R1_{Pd}$ being 0.06 or more and less than 1.15) of Example 12 to Example 22 had twice to about 5 times the Pt mass activity, and had about 1.8 times to about 2.7 times the initial value of ECSA, and had an excellent catalyst activity.

Further, from the results of the "relative value of the maintenance rate of ECSA" obtained from the initial value of ECSA and the measured value of ECSA after 12420 cycles of the potential sweepings, it has been clear that the electrode catalysts ($R1_{Pt}/R1_{Pd}$ being 1.15 to 6.00) of Example 1 to Example 11 had the same or more (about 1 to about 1.4 times) of the value of ECSA after 12420 cycles of the potential sweepings and the maintenance rate of ECSA in comparison with the electrode catalysts (Pt/C catalyst) of Comparative Example 1 and Comparative Example 3, and had durability at a practically durable level.

Furthermore, from the results shown in TABLE 3, it has been clear that the electrode catalysts of Example 12 to Example 22 could maintain the "relative value X" at an enough high level, i.e. about 1.4 times to about 2.3 times in comparison with the electrode catalyst of Comparative Example 3, and had durability at a practically durable level.

Furthermore, in TABLE 1, it has been clear that the electrode catalysts of Example 1 to Example 5 had the same maintenance rate of ECSA in comparison with Comparative Example 2 (Pt/Pd/C catalyst), and had an excellent durability at the same level of the Pt/Pd/C catalyst.

Further, in TABLE 2, it has been clear that the electrode catalysts of Example 6 to Example 11 had about 5 times the maintenance rate of ECSA in comparison with Comparative Example 4 (Pt/W/C). This fact proves that, when employing the structure where the layer containing the simple Pd exists as the first shell part like the electrode catalysts of Example 6 to Example 11, the durability is improved in comparison with the structure where the layer containing the simple Pd does not exist as the first shell part like Comparative Example 4. The tendency that the durability is improved by the existence of the layer containing the simple Pd as the first shell part is shown more remarkably in TABLE 3, by comparing the electrode catalysts of Example 12 to Example 22 with the electrode catalyst of Comparative Example 4 (Pt/W/C) in the "relative value X".

Furthermore, in TABLE 3, it was clear that the electrode catalysts of Example 12 to Example 22 had the same or more "relative value X" in comparison with Comparative Example 5 (Pt/Pd/C catalyst), and had an excellent durability at the same level of the Pt/Pd/C catalyst.

Furthermore, from the results shown in TABLE 4, the electrode catalyst (Pt/Pd/W/C catalyst) of Example 16 where the core particle was composed of the W carbide and the W oxide can reduce the eluted amount of Pd by about ½ in comparison with Comparative Example 5 (Pt/Pd/C catalyst).

From the above results, it has been clear that the electrode catalysts of the present working examples had the catalyst activity and durability at a practically durable level in comparison with the conventional Pt/C catalyst. Further it has been clear that, since the tungsten compounds were used as the materials of the electrode catalyst, the amount of platinum to be used can be decreased, which contributes to low cost performance.

APPLICABILITY TO INDUSTRIES

The present invention can provide an electrode catalyst which has the catalyst activity and durability at a practically durable level and contributes to lowering of the cost in comparison with the conventional Pt/C catalyst.

Accordingly, the present invention is a type of electrode catalyst that can be used not only in fuel-cell vehicles and electrical equipment industries such as those related to cellular mobiles, but also in Ene farms, cogeneration systems or the like, and thus, shall make contributions to the energy industries and developments related to environmental technologies.

EXPLANATION OF SYMBOLS

2: Support
3: Catalyst particle
4: Core part
5: First shell part
6: Second shell part
7: Shell part
10, 10A: Electrode catalyst
40: Fuel cell stack 40
42: MEA
43: Anode
43a: Gas diffusion layer
43b: Catalyst layer
44: Cathode
45: Electrolyte membrane
46: Separator
48: Separator
50: Rotating disk electrode measuring machine
51: Measuring cell
52: Fixing member
53: Lubbin tube
CE: Counter electrode
CL: Catalyst layer
ES: Electrolyte solution
RE: Reference electrode
WE: Rotating disk electrode

The invention claimed is:

1. An electrode catalyst comprises:
an electrically conductive support, and
catalyst particles supported on the support,
wherein
the catalyst particle comprises a core part formed on the support, a first shell part formed on the core part, and a second shell part formed on the first shell part,
the core part consisting of a W carbide or a W carbide and a W oxide, and further optionally containing element W,
the first shell contains element Pd, and
the second shell contains element Pt.

2. The electrode catalyst in accordance with claim 1, wherein a percentage of the element Pt $R1_{Pt}$ (atom %) and a percentage of the element Pd $R1_{Pd}$ (atom %) in an analytical region near a surface measured by X-ray photoelectron spectroscopy (XPS) satisfy the conditions of the following equation (1):

$$0.60 \leq (R1_{Pt}/R1_{Pd}) \leq 6.00 \tag{1}$$

3. The electrode catalyst in accordance with claim 2, wherein the $R1_{Pt}$ is 35 atom % or more.

4. The electrode catalyst in accordance with claim 2, wherein the $R1_{Pd}$ is 60 atom % or less.

5. The electrode catalyst in accordance with claim 2, wherein a percentage of W derived from the core part $R1_W$ in an analytical region near a surface measured by X-ray photoelectron spectroscopy (XPS) is 30 atom % or less.

6. The electrode catalyst in accordance with claim 1, wherein a support weight percentage of Pt $L_{Pt}$ (wt %) and a support rate of Pd $L_{Pd}$ (wt %) measured by ICP light emission analysis satisfy the conditions of the following equation (2)

$$L_{Pt}/L_{Pd} \geq 0.30 \tag{2}$$

7. The electrode catalyst in accordance with claim 1, wherein an average value of crystallite size of the catalyst particles measured by powder X-ray diffraction (XRD) is 3 to 22.0 nm.

8. The electrode catalyst in accordance with claim 1, wherein the catalyst is prepared by the steps comprising
a core particle forming step where the core particles containing the W carbide and the W oxide are formed on the support,
a first shell part forming step where the first shell part is formed on at least one of the surface of the core particles obtained by the core particle forming step, and
a second shell part forming step where the second shell part is formed on at least one of the surface of the first shell part obtained by the first shell part forming step,
and with respect to the core particles obtained by the core particle forming step, a percentage of the W carbide $R0_{WC}$ (atom %) and a percentage of the W oxide $R0_{WO}$ (atom %) in an analytical region near a surface measured by X-ray photoelectron spectroscopy (XPS) satisfy the conditions of the following equation (3)

$$R0_{WC}/(R0_{WC}+R0_{WO}) \geq 0.10 \tag{3}$$

9. The electrode catalyst in accordance with claim 8, wherein, with respect to the core particles obtained by the core particle forming step, a percentage of the W carbide $R0_{WC}$ (atom %) and a percentage of the W oxide $R0_{WO}$ (atom %) in an analytical region near a surface measured by X-ray photoelectron spectroscopy (XPS) satisfy the conditions of the following equation (4)

$$R0_{WC}/(R0_{WC}+R0_{WO}) \geq 0.25 \tag{4}$$

10. A composition for forming gas diffusion electrode which comprises the electrode catalyst in accordance with claim 1.

11. A gas diffusion electrode which comprises the electrode catalyst in accordance with claim 1.

12. A membrane-electrode assembly (MEA) comprising the gas diffusion electrode in accordance with claim 11.

13. A fuel cell stack comprising the membrane-electrode assembly (MEA) in accordance with claim 12.

* * * * *